United States Patent
Machida

(10) Patent No.: US 10,807,224 B2
(45) Date of Patent: Oct. 20, 2020

(54) IMPACT TOOL

(71) Applicant: MAKITA CORPORATION, Anjo-shi, Aichi (JP)

(72) Inventor: Yoshitaka Machida, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 488 days.

(21) Appl. No.: 15/645,644

(22) Filed: Jul. 10, 2017

(65) Prior Publication Data
US 2018/0015602 A1 Jan. 18, 2018

(30) Foreign Application Priority Data

Jul. 15, 2016 (JP) .................................. 2016-140638

(51) Int. Cl.
*B25D 16/00* (2006.01)
*B25D 11/06* (2006.01)
(Continued)

(52) U.S. Cl.
CPC .......... *B25D 16/003* (2013.01); *B25D 11/062* (2013.01); *F16D 13/24* (2013.01);
(Continued)

(58) Field of Classification Search
CPC ....... B25D 16/003; B25D 1/062; F16D 13/24; F16D 13/52
(Continued)

(56) References Cited

U.S. PATENT DOCUMENTS 6,035,945 A * 3/2000 Ichijyou ............... B25D 11/062
173/109
6,971,455 B2 * 12/2005 Shibata .................. B25D 16/00
173/109
(Continued)

FOREIGN PATENT DOCUMENTS

EP  3132897 A1  2/2017
GB  2171631 A   9/1986
(Continued)

OTHER PUBLICATIONS

Dec. 14, 2017 Search Report of European Patent Application No. 17181051.8.

*Primary Examiner* — Chelsea E Stinson
(74) *Attorney, Agent, or Firm* — Oliff PLC

(57) ABSTRACT

An impact tool includes a tool body, a tool holder, a cylindrical member, a reciprocating member, a motor, a first rotary body, a second rotary body, a swinging member, and clutch mechanisms. The clutch mechanisms are disposed between the first rotary body and the second rotary body on a power transmission path from the motor to the swinging member. The tool holder and the cylindrical member move together as a movable unit with respect to the tool body between a front end position and a separate position, according to a pressing force applied to the tool holder. The clutch mechanisms are each configured to start transmission of the first rotary body to the second rotary body while the movable unit moves from the front end position to the separate position and to interrupt transmission while the movable unit moves from the separate position to the front end position.

17 Claims, 12 Drawing Sheets

(51) Int. Cl.
  *F16D 13/24* (2006.01)
  *F16D 13/52* (2006.01)
  *F16D 21/08* (2006.01)

(52) U.S. Cl.
  CPC .............. *F16D 13/52* (2013.01); *F16D 21/08* (2013.01); *B25D 2250/051* (2013.01); *B25D 2250/131* (2013.01)

(58) Field of Classification Search
  USPC .......................................................... 173/90
  See application file for complete search history.

(56) References Cited

U.S. PATENT DOCUMENTS

| | | | | |
|---|---|---|---|---|
| 7,296,635 | B2* | 11/2007 | Droste | B25D 11/062 |
| | | | | 173/104 |
| 7,931,095 | B2* | 4/2011 | Machida | B25D 11/062 |
| | | | | 173/104 |
| 9,841,066 | B2* | 12/2017 | Yoshikane | B25D 16/003 |
| 2014/0174871 | A1* | 6/2014 | Yoshikane | B25D 16/003 |
| | | | | 192/48.1 |

FOREIGN PATENT DOCUMENTS

| | | |
|---|---|---|
| JP | 2006-181664 A | 7/2006 |
| WO | 88/06508 A2 | 9/1988 |

* cited by examiner

IMPACT TOOL

CROSS-REFERENCE TO RELATED APPLICATION

The present application claims priority to Japanese patent application No. 2016-140638 filed on Jul. 15, 2016, the content of which is incorporated herein by reference in its entirety.

TECHNICAL FIELD

The present invention relates to an impact tool which is configured to linearly drive a tool accessory in a direction of a hammering axis.

BACKGROUND

An impact tool is known which performs a hammering operation on a workpiece by linearly driving a tool accessory in a direction of a hammering axis. Such impact tool may be provided with a clutch mechanism for preventing the tool accessory from being driven in the direction of the hammering axis in a state in which the tool accessory is not pressed against a workpiece (so-called unloaded state). For example, Japanese Unexamined Patent Application Publication No. 2006-181664 discloses a hammer drill having a driving motor and a motion converting mechanism which converts rotating output of the driving motor into linear motion and transmits it to the tool accessory via a striking mechanism. When a hammering operation is performed in this hammer drill, in a state in which the tool accessory is pressed against the workpiece (so-called loaded state), a positive clutch is engaged and the motion converting mechanism is driven, so that power is transmitted to the tool accessory. On the other hand, in the unloaded state, the clutch is disengaged, so that transmission of power in the motion converting mechanism is interrupted. Therefore, the tool accessory is not driven in the unloaded state.

PRIOR ART DOCUMENT

Summary

In the above-described impact tool, when the tool accessory is pressed against the workpiece and the clutch is shifted from a disengaged state to an engaged state, rotating clutch teeth (projections) and non-rotating clutch teeth are abruptly engaged with each other, so that a large load is applied to the clutch teeth. Therefore, further improvement is desired to reduce the load applied to the clutch mechanism when shifting from the disengaged state to the engaged state.

Accordingly, it is an object of the present invention to provide an improved technique relating to a clutch mechanism of an impact tool.

According to an aspect of the present invention, an impact tool is provided which is configured to linearly drive a tool accessory in a direction of a hammering axis. This impact tool includes a tool body, a tool holder, a cylindrical member, a reciprocating member, a motor, a first rotary body, a second rotary body, a swinging member and a plurality of clutch mechanisms.

The tool holder is disposed in a front end region of the tool body and configured to hold the tool accessory in such a manner that the tool accessory is movable in the direction of the hammering axis with respect to the tool holder. The cylindrical member is connected to the tool holder. The reciprocating member is disposed within the cylindrical member in such a manner that the reciprocating member is reciprocatable in the direction of the hammering axis. The reciprocating member is configured to drive the tool accessory in the direction of the hammering axis. The first rotary body is configured to be rotationally driven by the motor around a rotation axis, which is parallel to the hammering axis. The second rotary body is rotatably disposed and coaxially arranged with the first rotary body. The swinging member is configured to swing according to rotation of the second rotary body and to thereby reciprocate the reciprocating member in the direction of the hammering axis. The plurality of clutch mechanisms are disposed between the first rotary body and the second rotary body on a power transmission path from the motor to the swinging member. Each of the plurality of clutch mechanisms is configured to transmit rotation of the first rotary body to the second rotary body.

The tool holder and the cylindrical member are configured to move together as a movable unit with respect to the tool body between a front end position and a separate position, according to a pressing force applied to the tool holder via the tool accessory. The movable unit is closer to the front end region in the front end position, and the movable unit is farther from the front end region in the separate position than in the front end position in the direction of the hammering axis. The plurality of clutch mechanisms are each configured to start transmission while the movable unit moves from the front end position to the separate position and to interrupt transmission while the movable unit moves from the separate position to the front end position.

In the above-described impact tool, the plurality of clutch mechanisms are disposed between the first rotary body and the second rotary body on the power transmission path from the motor to the swinging member. Transmission of rotation from the first rotary body to the second rotary body is started by the plurality of clutch mechanisms while the movable unit (the tool holder and the cylindrical member) moves from the front end position to the separate position. Therefore, load for the transmission can be distributed to the plurality of clutch mechanisms.

In the impact tool according to the above-described aspect, the timings at which the plurality of clutch mechanisms start transmission may be the same or may be different from each other. The timings at which the plurality of clutch mechanisms interrupt transmission may also be the same or may be different from each other.

The impact tool according to the above-described aspect may be realized as an impact tool configured to perform only a hammering operation in which the tool accessory is linearly driven in the direction of the hammering axis, or as an impact tool configured to perform a hammer drill operation in which the tool accessory is rotationally driven around the hammering axis while the tool accessory is linearly driven in the direction of the hammering axis. Further, the impact tool according to the above-described aspect may be realized as an impact tool capable of selectively performing any one of three operations, that is, the hammering operation, the hammer drill operation, and drilling operation in which the tool accessory is rotationally driven around the hammering axis.

According to an aspect of the impact tool of the present invention, the plurality of clutch mechanisms may include a first clutch mechanism and a second clutch mechanism. The movable unit may be configured to move between the front end position and the separate position by way of an intermediate position, which is located between the front end position and the separate position in the direction of the hammering axis. The first clutch mechanism may be configured to start transmission while the movable unit moves from the front end position to the intermediate position and to interrupt transmission while the movable unit moves from the intermediate position to the front end position. Further, the second clutch mechanism may be configured to start transmission while the movable unit moves from the intermediate position to the separate position and to interrupt transmission while the movable unit moves from the separate position to the intermediate position.

According to this aspect, the first and second clutch mechanisms start or interrupt transmission at different timings, so that the load on the second clutch mechanism which starts transmission later and interrupts transmission earlier can be made smaller than the load on the first clutch mechanism.

According to an aspect of the impact tool of the present invention, the first clutch mechanism may be configured as a friction clutch mechanism to perform transmission by frictional engagement, while the second clutch mechanism may be configured as a positive clutch mechanism to perform transmission by positive engagement. According to this aspect, the friction clutch mechanism which starts transmission earlier can smoothly establish engagement while absorbing impact, and synchronize the rotation speeds of the first rotary body and the second rotary body with each other. Thereafter, the positive clutch mechanism can establish reliable engagement.

According to an aspect of the impact tool of the present invention, the friction clutch mechanism may include a first engagement part and a second engagement part. The first engagement part may be configured to rotate around the rotation axis together with the first rotary body and have a first friction surface. The second engagement part may be configured to rotate around the rotation axis together with the second rotary body and have a second friction surface which is frictionally engageable with the first friction surface. The first and second engagement parts may be configured to move with respect to each other along the rotation axis in directions in which the first and second friction surfaces come into contact with and apart from each other along with movement of the movable unit. According to this aspect, the first and second engagement parts move along the rotation axis with respect to each other along with the movement of the movable unit, and thus can smoothly establish engagement according to the movement of the movable unit.

According to an aspect of the impact tool of the present invention, the friction clutch mechanism may further include a biasing part which is configured to bias at least one of the first and second engagement parts in such a direction that the first and second friction surfaces come into contact with each other. A biasing force of the biasing part may increase a frictional force between the first and second friction surfaces as the movable unit moves toward the separate position in a state in which the first and second friction surfaces are held in contact with each other. According to this aspect, the biasing part can absorb the impact caused when the first and second friction surfaces come into contact with each other. Further, the frictional force between the first and second friction surfaces increases as the movable unit moves toward the separate position, so that engagement between the first and second friction surfaces can be more smoothly established.

According to an aspect of the impact tool of the present invention, the friction clutch mechanism may be configured to perform transmission by frictional engagement between tapered surfaces which are inclined with respect to the rotation axis. According to this aspect, by a wedge effect of the friction surfaces formed as tapered surfaces, the friction surfaces are strongly pressed against each other by a relatively small force in the direction of the rotation axis, so that transmission can be reliably performed.

According to an aspect of the impact tool of the present invention, the friction clutch mechanism may be configured as a multi-disc clutch mechanism which includes a plurality of discs each having at least one friction surface. According to this aspect, stress such as a frictional force which is applied to each disc can be reduced, compared with a single-disc clutch mechanism, so that the life of the clutch mechanism can be prolonged. Further, relatively large torque can be obtained with respect to the radial size of the discs compared with a single-disc clutch mechanism.

According to an aspect of the impact tool of the present invention, the tool holder and the cylindrical member may be configured to rotate together around the hammering axis. The impact tool may further include a rotary drive mechanism configured to rotate the tool holder and the cylindrical member around the hammering axis.

According to an aspect of the impact tool of the present invention, the second rotary body may be configured to form a part of the movable unit, and to move in the direction of the hammering axis with respect to the tool body according to the pressing force applied to the tool holder via the tool accessory.

According to an aspect of the impact tool of the present invention, the second engagement part may be configured to form a part of the second rotary body.

According to an aspect of the impact tool of the present invention, the positive clutch mechanism may include a first engagement part and a second engagement part. The first engagement part may be formed on the first rotary body. The second engagement part may be formed on the second rotary body and configured to engage with the first engagement part.

According to an aspect of the impact tool of the present invention, the swinging member may be supported by the second rotary body between the first clutch mechanism and the second clutch mechanism in the direction of the rotation axis, in such a manner that the swinging member is rotatable with respect to the second rotary body and swingable in the direction of the hammering axis.

DETAILED DESCRIPTION OF THE EMBODIMENTS

Embodiments are now explained with reference to the drawings. Further, in the following embodiments, an electric hammer drill is described as an example of an impact tool which is configured to linearly drive a tool accessory in a direction of a hammering axis.

First Embodiment

A hammer drill 1 according to a first embodiment is now explained with reference to FIGS. 1 to 7.

Figure 1:
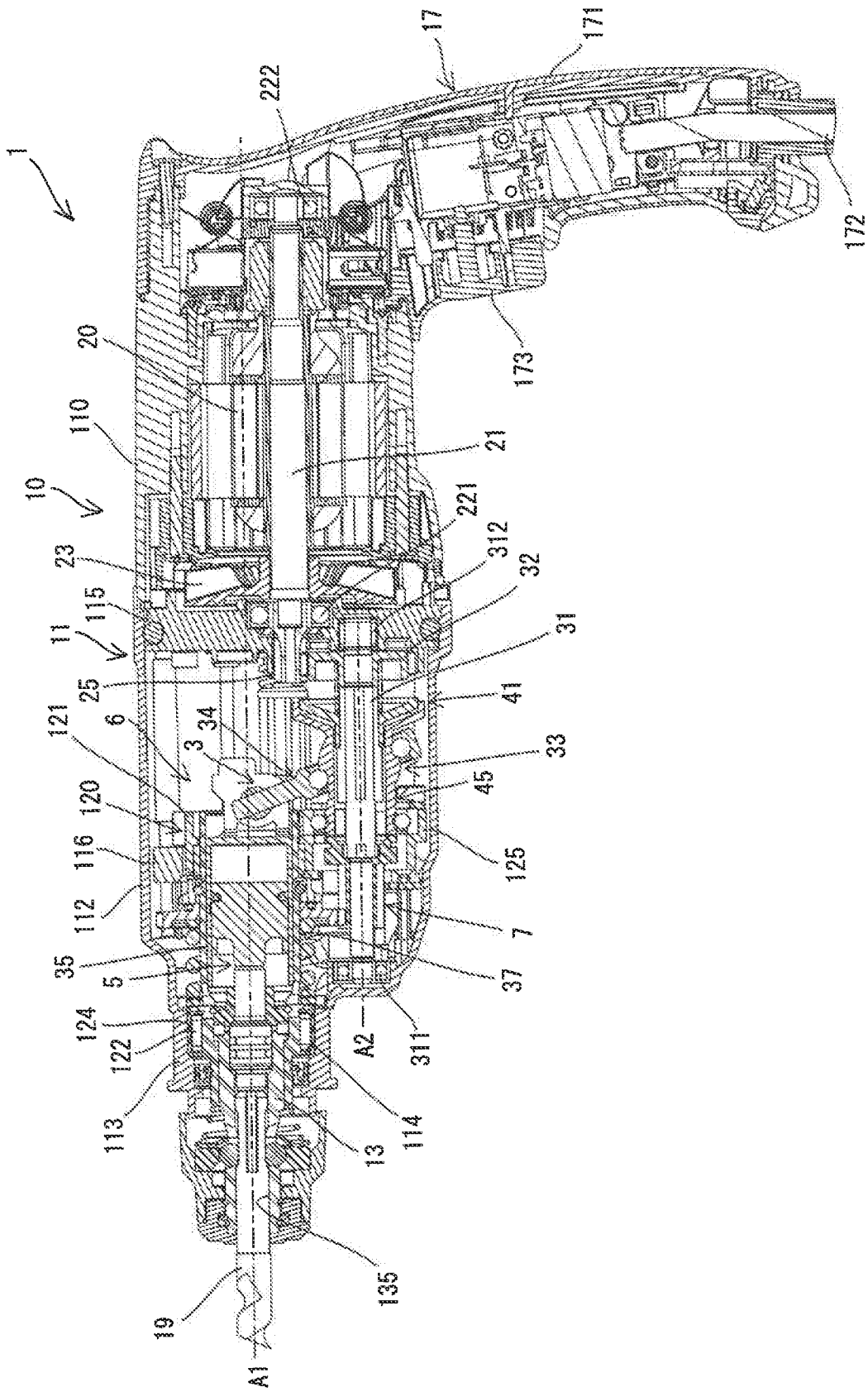
FIG. 1 is a longitudinal section view of a hammer drill according to a first embodiment of the present invention, in a foremost position.

First, an overall structure of the hammer drill 1 is briefly explained with reference to FIG. 1. As shown in FIG. 1, the hammer drill 1 includes a body 10 and a handle 17. The body 10 has an elongate shape. One end of the body 10 in its longitudinal direction has a generally circular cylindrical shape. This circular cylindrical part is referred to as a barrel 113. A tool holder 13 to which a tool accessory 19 may be removably attached is provided inside the barrel 113. The handle 17 designed to be held by a user extends in a direction crossing the longitudinal direction of the body 10 from the other end of the body 10 in its longitudinal direction.

The hammer drill 1 of this embodiment is configured to perform an operation in which the tool accessory 19 is linearly driven along a specified hammering axis A1 (hereinafter referred to as a hammering operation) and an operation in which the tool accessory 19 is rotationally driven around the hammering axis A1 (hereinafter referred to as a drilling operation). A user may select the tool accessory 19 (such as a hammer bit and a drill bit) of appropriate kind and length according to an operation to be performed and attach the tool accessory 19 to the tool holder 13 in such a manner that an axis of the tool accessory 19 coincides with the hammering axis A1. In the hammer drill 1 of this embodiment, the hammering axis A1 extends in the longitudinal direction of the body 10.

The structure of the hammer drill 1 is now explained in detail. In the following explanation, for convenience sake, the longitudinal direction of the body 10 (in other words, the direction of the hammering axis A1 or the axial direction of the tool accessory 19) is defined as a front-rear direction of the hammer drill 1. Here, the tool holder 13 (the barrel 113) side is defined as a front (or a front end region) side of the hammer drill 1 and the handle 17 side is defined as a rear side of the hammer drill 1. Further, a direction which is perpendicular to the longitudinal direction of the body 10 and which corresponds to the extending direction of the handle 17 is defined as an up-down direction. Here, one side of the handle 17 connected to the body 10 is defined as an upper side and the other side of the handle 17 having a distal end (free end) is defined as a lower side.

The body 10 is explained with reference to FIGS. 1 to 4. The body 10 mainly includes a body housing 11, a motor 20, a motion converting mechanism 3, a first clutch mechanism 41, a second clutch mechanism 45, a striking mechanism 5 and a rotation transmitting mechanism 7.

As shown in FIG. 1, the body housing 11 is a hollow housing that forms an outer shell of the body 10. In this embodiment, the body housing 11 mainly includes a motor housing 110 that forms a rear part of the body housing 11 and a gear housing 112 that forms a front part of the body housing 11. The motor housing 110 and the gear housing 112 are fixedly connected to each other by screws to form the body housing 11.

The motor 20 is housed in the motor housing 110. In this embodiment, an AC motor is employed as the motor 20 which serves as a driving source of the tool accessory 19. However, the motor 20 may be a DC motor with a brush or a brushless motor. The motor 20 is fixed to the motor housing 110 by fastening means such as screws such that a rotation axis of an output shaft 21 of the motor 20 is parallel to the hammering axis A1 (that is, extends in the front-rear direction).

The output shaft 21 is rotatably supported at its front and rear end parts by a front bearing 221 and a rear bearing 222, respectively. The front bearing 221 is supported by a rear support 115 which is described below and the rear bearing 222 is supported by the motor housing 110. A fan 23 is disposed between the motor 20 and the front bearing 221. The fan 23 is fixed to the output shaft 21 and configured to cool the motor 20 by rotating together with the output shaft 21. The output shaft 21 has a front end part which extends forward from the front bearing 221 and protrudes into the gear housing 112. A first driving gear 25 is formed on an outer periphery of the front end part of the output shaft 21.

The gear housing 112 houses the motion converting mechanism 3, the striking mechanism 5, the rotation transmitting mechanism 7, the first clutch mechanism 41 and the second clutch mechanism 45. Rotating output (power) of the motor 20 is transmitted to the motion converting mechanism 3 and the rotation transmitting mechanism 7 via the first driving gear 25. The motion converting mechanism 3 converts rotation of the output shaft 21 into linear motion and transmits it to the striking mechanism 5. The striking mechanism 5 strikes the tool accessory 19 held by the tool holder 13 and thereby drives the tool accessory 19 linearly in the direction of the hammering axis A1. The rotation transmitting mechanism 7 appropriately reduces the speed of rotation of the output shaft 21 and then transmits it to the tool holder 13, thereby rotationally driving the tool accessory 19 around the hammering axis A1.

The hammer drill 1 of this embodiment is configured such that any one of three modes, that is, a hammer drill mode, a hammer mode and a drill mode, is selectable by operation of a mode change lever (not shown) provided on a lower part of the body 10. In the hammer drill mode, the hammering operation and the drilling operation are performed by driving the motion converting mechanism 3 and the rotation transmitting mechanism 7. In the hammer mode, only the hammering operation is performed by driving only the motion converting mechanism 3 while interrupting power transmission in the rotation transmitting mechanism 7. In the drill mode, only the drilling operation is performed by driving only the rotation transmitting mechanism 7 while interrupting power transmission in the motion converting mechanism 3.

Further, in this embodiment, in the hammer drill mode and the hammer mode, the motion converting mechanism 3 is switched between a power transmission state and a transmission interrupted state according to a pressing force applied to the tool holder 13 via the tool accessory 19. For this purpose, mechanisms relating to the hammering operation is configured to be movable in the direction of the hammering axis A1 (the front-rear direction) with respect to the body housing 11. In addition, the first clutch mechanism 41 and the second clutch mechanism 45 are provided on a power transmission path. The internal configuration of the gear housing 112 including these structures is described below in detail.

The handle 17 is explained with reference to FIG. 1. As shown in FIG. 1, the handle 17 has a handle housing 171 that forms an outer shell of the handle 17, a power cable 172 and a trigger 173. The power cable 172 for connection to an external AC power source extends from a lower end of the handle housing 171. The trigger 173 is provided in an upper front part of the handle housing 171. When a user depresses the trigger 173, a switch connected to the trigger 173 is turned on and then the motor 20 is energized.

The internal structure of the gear housing 112 is now explained in detail with reference to FIGS. 1 to 4.

The tool holder 13 and a piston sleeve 37 are explained with reference to FIGS. 1 and 2. As described above, the tool holder 13 is disposed within the barrel 113 formed in a front end part (also referred to as a front end region) of the gear housing 112. The tool holder 13 is configured to hold the tool accessory 19 in such a manner that the tool accessory 19 can move in the direction of the hammering axis A1. In this embodiment, the tool holder 13 has a generally circular cylindrical shape having an insert hole 135 extending in the direction of the hammering axis A1. The tool holder 13 holds the tool accessory 19 inserted into the insert hole 135 in a state in which the tool accessory 19 is movable in the direction of the hammering axis A1, but not rotatable around the hammering axis A1 with respect to the tool holder 13. The piston sleeve 37 is a generally circular cylindrical member which is coaxially arranged with the hammering axis A1. In this embodiment, the piston sleeve 37 is coaxially connected to the tool holder 13 with its front end part fitted onto an outer periphery of a rear end part of the tool holder 13. A piston cylinder 35 which is described below is slidably held within the piston sleeve 37.

The tool holder 13 and the piston sleeve 37 are supported so that the tool holder 13 and the piston sleeve 37 can rotate together around the hammering axis A1 with respect to the body housing 11. Specifically, as shown in FIG. 2, the front end part of the piston sleeve 37 (which is fitted over the rear end part of the tool holder 13) is rotatably supported by a bearing 122 held by a bearing case 124 which is described below. The rear end part of the piston sleeve 37 is rotatably supported by a bearing 123 held by a striking unit holder 120 which is described below.

A support structure which is provided inside the gear housing 112 is explained with reference to FIG. 2. A rear support 115 and a central support 116 are fixed inside the gear housing 112.

The rear support 115 is disposed in a rear end part of the gear housing 112. As described above, the rear support 115 holds the front bearing 221 of the output shaft 21 of the motor 20. Further, the rear support 115 supports a rear end part of an intermediate shaft 31 (which is described below) below the front bearing 221 via a rear bearing 312.

The central support 116 is provided generally in the center of the gear housing 112 in the front-rear direction. Four guide shafts 117 extend in the front-rear direction between the central support 116 and the rear support 115. A front end of each of the guide shafts 117 is fixed to the central support 116 and a rear end of each of the guide shafts 117 is fixed to the rear support 115. The four guide shafts 117 are grouped as two pairs of right and left guide shafts 117, and the two pairs are respectively arranged above and below the hammering axis A1, although only the two right guide shafts 117 are shown in FIG. 2. Further, the pair of right and left guide shafts 117 are arranged symmetrically with respect to a virtual plane including the hammering axis A1 and extending in the up-down direction. A striking unit 6 (which is described below) is supported by the guide shafts 117 to be relatively movable in the front-rear direction with respect to the guide shafts 117, which is described below in further detail.

The motion converting mechanism 3 is explained with reference to FIGS. 2 and 3. The motion converting mechanism 3 is configured to convert the rotating motion of the output shaft 21 into the reciprocating motion of the piston cylinder 35 in the direction of the hammering axis A1. As shown in FIG. 2, in this embodiment, the motion converting mechanism 3 includes the intermediate shaft 31, a first driven gear 32, a rotary body 33, a swinging member 34, the piston cylinder 35 and the piston sleeve 37.

The intermediate shaft 31 is disposed within a lower region of the gear housing 112. The intermediate shaft 31 extends in the front-rear direction in parallel to the rotation axis of the output shaft 21 of the motor 20 (in other words, in parallel to the hammering axis A1). The intermediate shaft 31 is rotatably supported at its front and rear end parts by the front and rear bearings 311, 312, respectively. The front bearing 311 is held by a lower front end part of the gear housing 112 and the rear bearing 312 is held by the rear support 115. The first driven gear 32 is fixed on a rear end part of the intermediate shaft 31, and configured to rotate together with the intermediate shaft 31. The first driven gear 32 has an annular recess 321 which is recessed from the front to the rear.

A gear part 320 is formed on an outer periphery of the first driven gear 32 and held in engagement with the first driving gear 25. Therefore, when the output shaft 21 is rotationally driven by the motor 20, the intermediate shaft 31 also rotates. Specifically, the intermediate shaft 31 is configured to be rotationally driven by the motor 20 around a rotation axis A2 which is parallel to the hammering axis A1.

The rotary body 33 is coaxially arranged with the intermediate shaft 31. The rotary body 33 is supported at its front end part by a bearing 331 to be rotatable around the rotation axis A2. The bearing 331 is held by the striking unit holder 120 (more specifically, a lower holding part 125) which is described below. As shown in FIG. 3, in this embodiment, the rotary body 33 is cylindrically shaped and has a through hole 335 extending through the rotary body 33 along the rotation axis A2. The intermediate shaft 31 is inserted coaxially with the rotary body 33 through the through hole 335 without contact with the rotary body 33. The rotary body 33 has a support part 333 which is configured to support a swinging member 34 (which is described below) to be rotatable and to be swingable with respect to the rotary body 33. The rotary body 33 is configured such that rotation of the intermediate shaft 31 is transmitted to the rotary body 33 when at least one of a first clutch mechanism 41 and a second clutch mechanism 45 (which are described below) is in a transmission state, which is described below in detail.

The swinging member 34 is configured to swing according to rotation of the rotary body 33 and to thereby reciprocate the piston cylinder 35 (which is described below) in the direction of the hammering axis A1 (the front-rear direction). In this embodiment, the swinging member 34 is caused to swing in the front-rear direction by rotation of the rotary body 33.

The piston cylinder 35 has a bottomed circular cylindrical shape. The piston cylinder 35 is configured to reciprocate in the direction of the hammering axis A1. As shown in FIG. 2, in this embodiment, the piston cylinder 35 is housed within the piston sleeve 37 so as to be movable in the direction of the hammering axis A1 (in the front-rear direction). A rear end part of the piston cylinder 35 is connected to the swinging member 34 via a rotatable shaft. Thus, the piston cylinder 35 is caused to reciprocate in the front-rear direction along an inner peripheral surface of the piston sleeve 37 by swinging movement of the swinging member 34 in the front-rear direction.

The striking mechanism 5 is explained with reference to FIG. 2. As shown in FIG. 2, the striking mechanism 5 includes a striker 51 and an impact bolt 53. The striker 51 is disposed within the piston cylinder 35 and configured to slide along the inner peripheral surface of the piston cylinder 35 in the direction of the hammering axis A1. An air chamber 353 is formed between the striker 51 and a bottom 351 of the piston cylinder 35 and serves to linearly move the striker 51 via pressure fluctuations of air caused by reciprocating movement of the piston cylinder 35.

The impact bolt 53 is held within the rear end part of the tool holder 13 in front of the striker 51. The impact bolt 53 is configured as an intermediate element to transmit kinetic energy of the striker 51 to the tool accessory 19. The impact bolt 53 is held to be movable in the direction of the hammering axis A1 behind the tool accessory 19 inserted into the insertion hole 135. Further, a rear end part of the impact bolt 53 protrudes into the piston cylinder 35.

When the motor 20 is driven and the piston cylinder 35 is moved forward by the swinging member 34, the air within the air chamber 353 is compressed and the internal pressure increases. Thus, the striker 51 is pushed forward at high speed, strikes the impact bolt 53 and transmits the kinetic energy to the tool accessory 19. As a result, the tool accessory 19 is linearly driven along the hammering axis A1 and strikes the workpiece. On the other hand, when the piston cylinder 35 is moved rearward by the swinging member 34, the air within the air chamber 353 is expanded and the internal pressure decreases, so that the striker 51 is retracted rearward. The hammer drill 1 performs hammering operation by causing the motion converting mechanism 3 and the striking mechanism 5 to repeat such motion.

In this embodiment, mechanisms relating to the above-described hammering operation are configured to form a striking unit 6 which can integrally move (as one unit) in the direction of the hammering axis A1 with respect to the body housing 11. The striking unit 6 is now explained with reference to FIGS. 1 and 2. As shown in FIG. 2, the striking unit 6 includes the striking unit holder 120, the bearing case 124, the tool holder 13, the piston sleeve 37, the piston cylinder 35, the striking mechanism 5, the rotary body 33 and the swinging member 34.

The striking unit holder 120 is formed by fixedly connecting an upper holding part 121 and a lower holding part 125. The upper holding part 121 forms an upper part of the striking unit holder 120, and the lower holding part 125 forms a lower part of the striking unit holder 120. The upper holding part 121 holds the rear end part of the piston sleeve 37 which is connected to the tool holder 13, via the bearing 123. The lower holding part 125 holds a front end part 332 of the rotary body 33 via the bearing 331. The bearing case 124 is mounted on the front end part of the piston sleeve 37 (which is fitted over the rear end part of the tool holder 13) via the bearing 122. With these structures, the tool holder 13 and the piston sleeve 37 which are integrally connected together, the piston cylinder 35 and the striking mechanism 5 which are housed in the tool holder 13 and the piston sleeve 37, the rotary body 33, and the swinging member 34 which connects the piston cylinder 35 and the rotary body 33 are all held by the striking unit holder 120 and the bearing case 124. In this manner, the striking unit 6 is formed as a single assembly.

Four guide holes (not shown) extend through the striking unit holder 120 in the front-rear direction. The four guide shafts 117 which are mounted to the central support 116 and the rear support 115 and extend in the front-rear direction are inserted through these four guide holes. Thus, the striking unit holder 120 is supported by the guide shafts 117 so as to be movable in the front-rear direction with respect to the body housing 11. Further, the bearing case 124 has a generally circular cylindrical shape and is disposed within the barrel 113 so as to be slidable along an inner periphery of the barrel 113. With such a structure, the whole striking unit 6 is supported by the four guide shafts 117 so as to be movable in the direction of the hammering axis A1 (the front-rear direction) with respect to the body housing 11.

The striking unit 6 is held biased forward in an unloaded state in which the striking unit 6 is not pressed rearward via the tool accessory 19. Specifically, a compression coil spring 118 is fitted on each of the right and left lower guide shafts 117. A front end of the compression coil spring 118 is held in contact with a rear end of the striking unit holder 120, and a rear end of the compression coil spring 118 is held in contact with a front end of the rear support 115. The compression coil springs 118 always bias the striking unit holder 120 forward. Thus, in the unloaded state, the striking unit 6 is placed at a foremost position shown in FIGS. 1 and 2 by the biasing force of the compression coil springs 118. At this time, the bearing case 124 which holds the front end part of the piston sleeve 37 via the bearing 122 comes in contact from the rear with a stepped part 114 formed in an inner periphery of the barrel 113. In other words, the stepped part 114 prevents the striking unit 6 from further moving forward and thus defines the foremost position of the striking unit 6.

When the tool accessory 19 is pressed against the workpiece, the tool holder 13 is pressed rearward via the tool accessory 19. As a result, the striking unit 6 is placed in a loaded state in which a rearward pressing force is applied to the striking unit 6. In the loaded state, the striking unit 6 is caused to move rearward along the guide shafts 117 against the biasing force of the compression coil springs 118 according to the applied pressing force. This positional change is described below in further detail.

The rotation transmitting mechanism 7 is now explained with reference to FIG. 2. The rotation transmitting mechanism 7 is configured to transmit rotation of the output shaft 21 of the motor 20 to the tool holder 13. In this embodiment, the rotation transmitting mechanism 7 is configured as a gear speed reducing mechanism including a plurality of gears. Specifically, as shown in FIG. 2, the rotation transmitting mechanism 7 includes the intermediate shaft 31 and the first driven gear 32 which are described above, a second driving gear 70 and a second driven gear 75.

The second driving gear 70 is coaxially arranged with the intermediate shaft 31. The second driving gear 70 has a generally circular cylindrical shape and is loosely disposed around the intermediate shaft 31. The second driving gear 70 has a spline engagement part 72 which is configured to engage with spline grooves formed in the intermediate shaft 31. The second driving gear 70 is thus configured to rotate together with the intermediate shaft 31 by spline connection to the intermediate shaft 31, and to slide with respect to the intermediate shaft 31 in the direction of the rotation axis A2 (the front-rear direction). As shown in FIG. 2, when the second driving gear 70 is located in a connected position to be spline-connected to the intermediate shaft 31, the second driving gear 70 rotates together with the intermediate shaft 31. On the other hand, although not shown, when the second driving gear 70 is moved forward and placed in a non-connected position in which the spline connection part 72 is disengaged from the spline grooves of the intermediate shaft 31, rotation of the intermediate shaft 31 is not transmitted to the second driving gear 70, so that the second driving gear 70 is not rotated.

The second driving gear 70 is caused to move in the front-rear direction by a switching mechanism (not shown) which is configured to operate in conjunction with operation of the above-described mode change lever (not shown). Specifically, when the hammer mode is selected with the mode change lever, the second driving gear 70 is placed in the non-connected position by the switching mechanism. When the hammer drill mode or drill mode is selected, the second driving gear 70 is placed in the connected position by the switching mechanism. The structures of the mode change lever and the switching mechanism are well known, and therefore their explanation is omitted here.

The second driven gear 75 is fixed on an outer periphery of the piston sleeve 37 and engaged with the second driving gear 70. Further, when the second driven gear 75 moves in the front-rear direction with respect to the body housing 11 together with the striking unit 6 including the piston sleeve 37, the second driven gear 75 also moves with respect to the second driving gear 70. Therefore, the length of the second driving gear 70 in the front-rear direction is set such that the second driving gear 70 is always engaged with the second driven gear 75 even when the second driven gear 75 moves with respect to the second driving gear 70.

In the hammer drill mode or drill mode, when the second driving gear 70 rotates together with the intermediate shaft 31 by driving of the motor 20, the piston sleeve 37 is rotated around the hammering axis A1 via the second driven gear 75. Thus, the tool holder 13 connected to the piston sleeve 37 and the tool accessory 19 held by the tool holder 13 also rotate around the hammering axis A1. In this manner, the hammer drill 1 performs drilling operation.

The structures of the first clutch mechanism 41 and the second clutch mechanism 45 are now explained with reference to FIGS. 2 to 4. Both the first clutch mechanism 41 and the second clutch mechanism 45 are disposed between the intermediate shaft 31 and the rotary body 33 on a power transmission path from the motor 20 to the swinging member 34, and configured to transmit rotation of the intermediate shaft 31 to the rotary body 33.

First, the first clutch mechanism 41 is explained. As shown in FIG. 3, the first clutch mechanism 41 has a first engagement part 411, a second engagement part 416 and a biasing spring 42. The first clutch mechanism 41 is configured as a friction clutch mechanism (more specifically, a cone clutch), and the first and second engagement parts 411, 416 are configured to be frictionally engageable with each other.

The first engagement part 411 is spline-connected to the intermediate shaft 31. The first engagement part 411 is configured to be rotatable together with the intermediate shaft 31 and to be movable in the direction of the rotation axis A2 (the front-rear direction) with respect to the intermediate shaft 31. More specifically, as shown in FIG. 3, the first engagement part 411 is a cylindrical member having a funnel shape as a whole. The first engagement part 411 includes a circular cylinder part 412, a flange part 413 and an outer edge part 414.

The circular cylinder part 412 is disposed within the through hole 335 without contact with the rotary body 33 and spline-connected to the intermediate shaft 31. The flange part 413 extends radially outward and rearward from a rear end of the circular cylinder part 412 and is conically shaped to have a diameter enlarged toward the rear. The outer edge part 414 extends radially outward and rearward from a rear end of the flange part 413 and is conically shaped to have a diameter enlarged toward the rear. However, the angle (cone angle) formed between an outer peripheral surface of the outer edge part 414 and the rotation axis A2 of the intermediate shaft 31 is remarkably smaller than the angle (cone angle) formed between an outer peripheral surface of the flange part 413 and the rotation axis A2 of the intermediate shaft 31. In this embodiment, the cone angle of the outer edge part 414 is set to be about 2 to 5 degrees. An outer peripheral surface (an outer surface in the radial direction with respect to the rotation axis A2) of the outer edge part 414 is formed as a first friction surface 415 (see FIG. 4) which is frictionally engageable with a second friction surface 419 of the second engagement part 416 which is described below.

The biasing spring 42 is disposed between a rear end surface of the circular cylinder part 412 and a bottom of the recess 321 of the first driven gear 32 which is fixed to the rear end part of the intermediate shaft 31. In this embodiment, the biasing spring 42 is configured as a compression coil spring. The biasing spring 42 always biases the first engagement part 411 forward. First clutch teeth 451 are formed on a central part of the intermediate shaft 31 in the front-rear direction and protrude radially outward from the outer peripheral surface of the intermediate shaft 31. When a front end of the circular cylinder part 412 is held in contact with a rear end of the first clutch teeth 451, the first engagement part 411 is prevented from further moving forward. In other words, the first clutch teeth 451 define a foremost position of the first engagement part 411.

Figure 3:
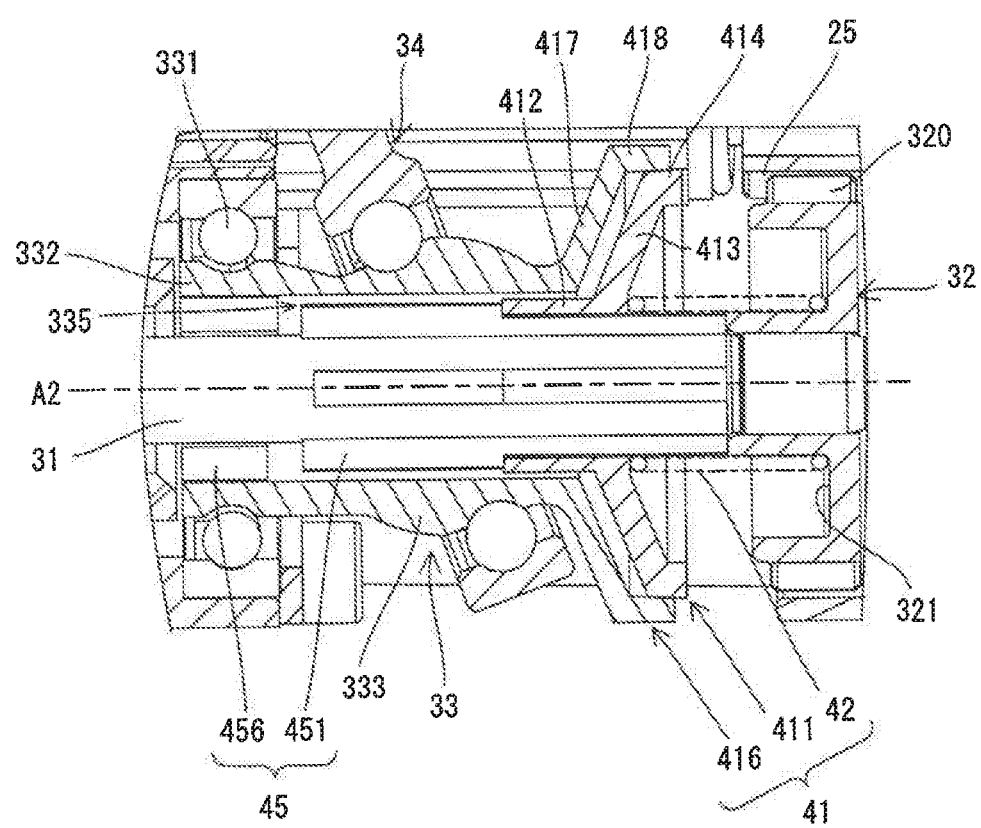
FIG. 3 is an enlarged view of first and second clutch mechanisms and their peripheral region in FIG. 1.

As shown in FIG. 3, the second engagement part 416 forms a rear end part of the rotary body 33. In other words, the second engagement part 416 is configured as a part of the rotary body 33 and configured to rotate together with the support part 333 which supports the swinging member 34. The second engagement part 416 includes a flange part 417 and an outer part edge 418. The flange part 417 and the outer edge part 418 are conically shaped, respectively corresponding to the flange part 413 and the outer edge part 414 of the first engagement part 411 and slightly larger than the flange part 413 and the outer edge part 414. An inner peripheral surface (an inner surface in the radial direction with respect to the rotation axis A2) of the outer edge part 418 is formed as a second friction surface 419 (see FIG. 4) which can be frictionally engaged with the first friction surface 415 of the first engagement part 411. An angle of the second friction surface 419 to the rotation axis A2 is substantially identical to the angle of the first friction surface 415.

Figure 2:
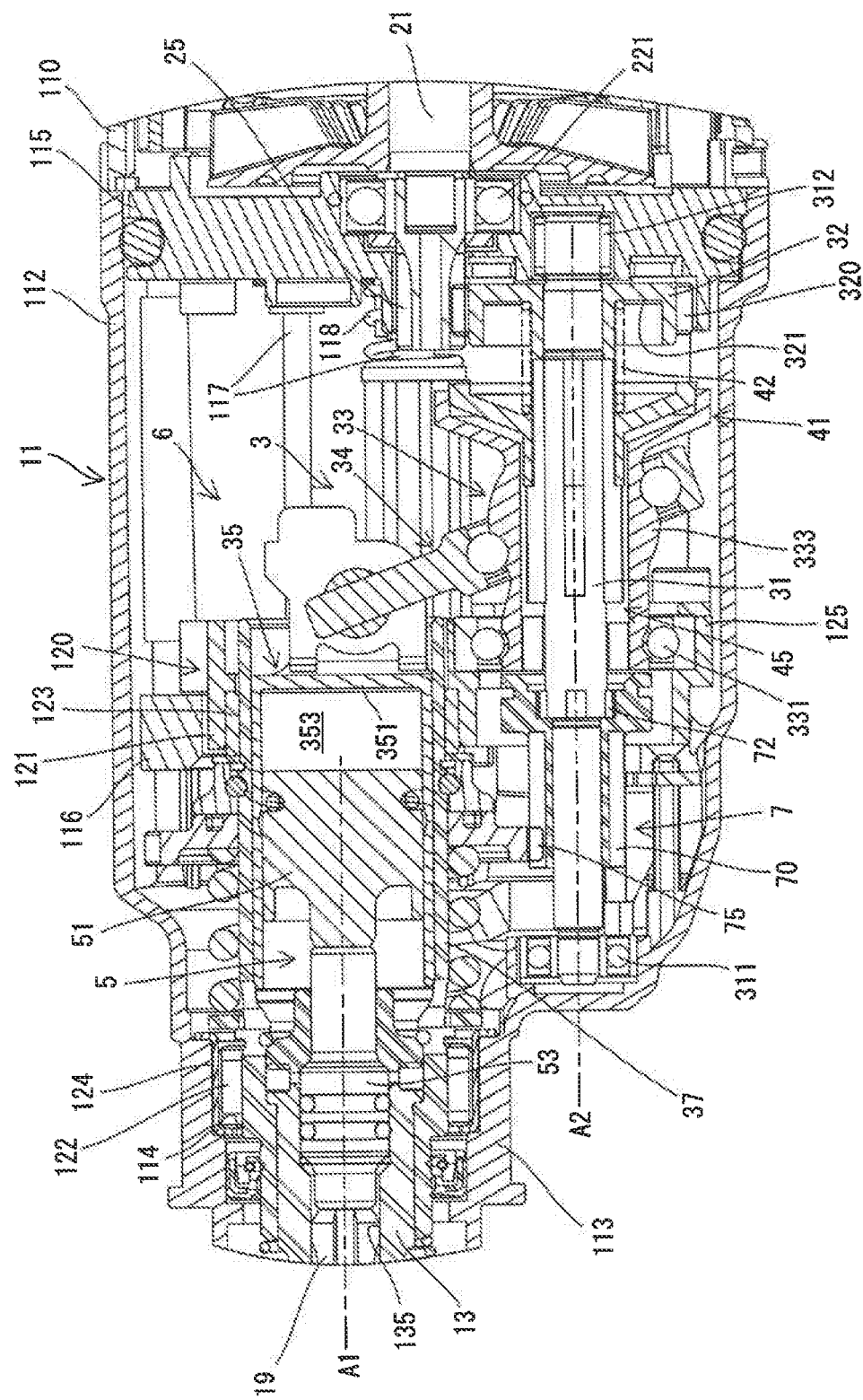
FIG. 2 is an enlarged view of a gear housing in FIG. 1.

When the striking unit 6 is placed at the foremost position by the biasing force of the compression coil springs 118, as shown in FIG. 2, that is, in the unloaded state, the first friction surface 415 of the first engagement part 411 and the second friction surface 419 of the second engagement part 416 face each other with a slight clearance as shown in FIG.

4. Therefore, even if the first engagement part 411 rotates together with the intermediate shaft 31, the rotation is not transmitted to the second engagement part 416 of the rotary body 33. In other words, the first clutch mechanism 41 is in a transmission interrupted state in which rotation is not transmitted from the intermediate shaft 31 to the rotary body 33.

Next, the second clutch mechanism 45 is explained. As shown in FIG. 3, the second clutch mechanism 45 has the first clutch teeth 451 and second clutch teeth 456. The first clutch teeth 451 are provided on the intermediate shaft 31 and configured to rotate together with the intermediate shaft 31. The second clutch teeth 456 are provided on the rotary body 33 and configured to rotate together with the rotary body 33. The second clutch mechanism 45 is configured as a positive clutch (or a dog clutch) mechanism, and the first clutch teeth 451 and the second clutch teeth 456 can be positively engaged (or mechanically engaged) with each other.

As described above, the first clutch teeth 451 are provided on the central part of the intermediate shaft 31 in the front-rear direction and protrude radially outward from the outer peripheral surface of the intermediate shaft 31. The protruding length of the first clutch teeth 451 from the outer peripheral surface of the intermediate shaft 31 is set such that the first clutch teeth 451 do not come into contact with any part of the rotary body 33 other than the second clutch teeth 456. The second clutch teeth 456 are provided inside the front end part 332 and protrude radially inward from the inner peripheral surface of the rotary body 33 which defines the through hole 335. The second clutch teeth 456 are configured to engage with the first clutch teeth 451.

As shown in FIG. 2, when the striking unit 6 is placed at the foremost position, or in the unloaded state, as shown in FIG. 3, the first clutch teeth 451 and the second clutch teeth 456 are located apart from each other in the front-rear direction. Therefore, when the first clutch teeth 451 rotate together with the intermediate shaft 31, the rotation is not transmitted to the second clutch teeth 456 of the rotary body 33. In other words, like the first clutch mechanism 41, the second clutch mechanism 45 is also in the transmission interrupted state in which rotation is not transmitted from the intermediate shaft 31 to the rotary body 33.

The first clutch mechanism 41 and the second clutch mechanism 45 which have the above-described structures are configured to start transmitting rotation in this order from the intermediate shaft 31 to the rotary body 33 when the tool holder 13 is pressed via the tool accessory 19 and the striking unit 6 is moved rearward with respect to the body housing 11.

When the drill mode is selected, however, in the hammer drill 1 of this embodiment, relative movement of the striking unit 6 is inhibited so as not to perform hammering operation. Specifically, when the drill mode is selected, the switching mechanism (not shown) comes in contact with the striking unit holder 120 and prevents the striking unit 6 from moving rearward. When the hammer drill mode or the hammer mode is selected, the switching mechanism does not come into contact with the striking unit holder 120 and allows the striking unit 6 to move rearward. Such a structure is well known and therefore its further detailed explanation is omitted.

Positional change of the striking unit 6 and operations of the first and second clutch mechanisms 41, 45 in the hammer drill mode or the hammer mode are now explained with reference to FIGS. 1 to 7.

When the trigger 173 is depressed in the unloaded state, the motor 20 is driven and the intermediate shaft 31 rotates. At this time, as shown in FIGS. 1 to 4, the striking unit 6 is located at the foremost position and both of the first and second clutch mechanisms 41, 45 are in the transmission interrupted state, so that the tool accessory 19 is not driven in the direction of the rotation axis A1. It is noted that, in the hammer drill mode, as described above, the tool accessory 19 is rotationally driven by the rotation transmitting mechanism 7.

When the tool accessory 19 is pressed against the workpiece and a rearward pressing force is applied to the tool holder 13, the striking unit 6 is caused to move rearward with respect to the body housing 11. Therefore, the rotary body 33 moves rearward with respect to the intermediate shaft 31. Specifically, the rotary body 33 moves rearward with respect to the first engagement part 411 and the first clutch teeth 451. The second engagement part 416 of the rotary body 33 moves toward the first engagement part 411 and the second friction surface 419 comes in contact with the first friction surface 415. At this time, the biasing spring 42 absorbs impact caused by this contact. When the striking unit 6 further moves rearward and the second friction surface 419 is pressed against the first friction surface 415, the first clutch mechanism 41 starts transmitting rotation from the intermediate shaft 31 to the rotary body 33. In other words, the first clutch mechanism 41 is placed in the transmission state. The terms "start transmitting" and "placed in the transmission state" as used herein refer to reaching a state in which transmission of rotation (including a slipping state) between the first engagement part 411 and the second engagement part 416 is taking place.

After the second fiction surface 419 comes in contact with the first fiction surface 415, the second engagement part 416 moves rearward while pressing the first engagement part 411 rearward against the biasing force of the biasing spring 42. Thus, the frictional force between the second friction surface 419 and the first friction surface 415 increases. Further, with the structure in which the second friction surface 419 and the first friction surface 415 are configured as a tapered surface (conical surface) which extends rearward with a slight inclination with respect to the rotation axis A2 of the intermediate shaft 31, the friction surfaces are more strongly pressed against each other by the rearward pressing force of the second engagement part 416 so that transmission is reliably performed, compared with a structure in which the second friction surface 419 and the first friction surface 415 are perpendicular to the rotation axis A2 or more largely inclined with respect to the rotation axis A2.

Figure 5:
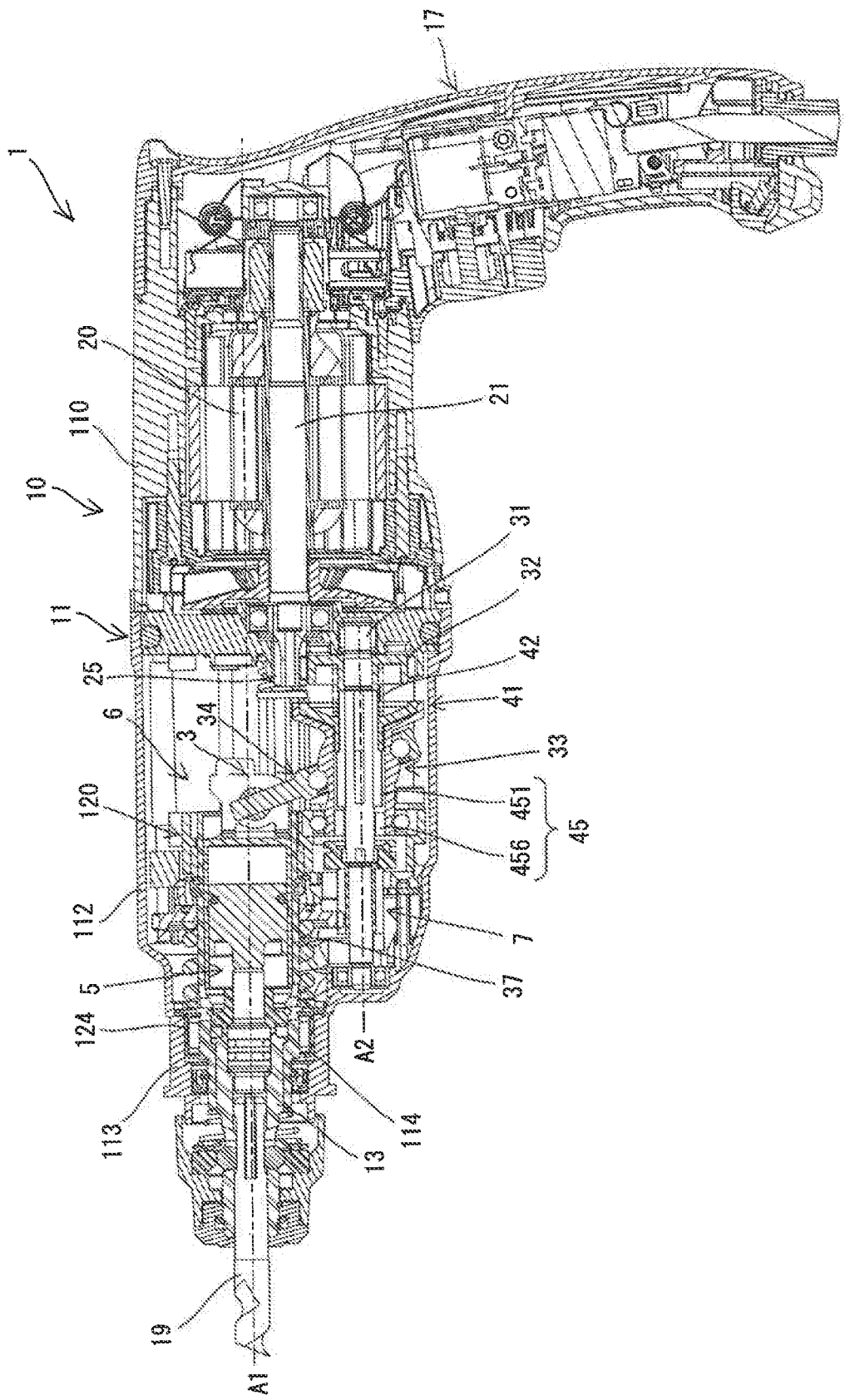
FIG. 5 is a longitudinal section view of the hammer drill in an intermediate position.
Figure 6:
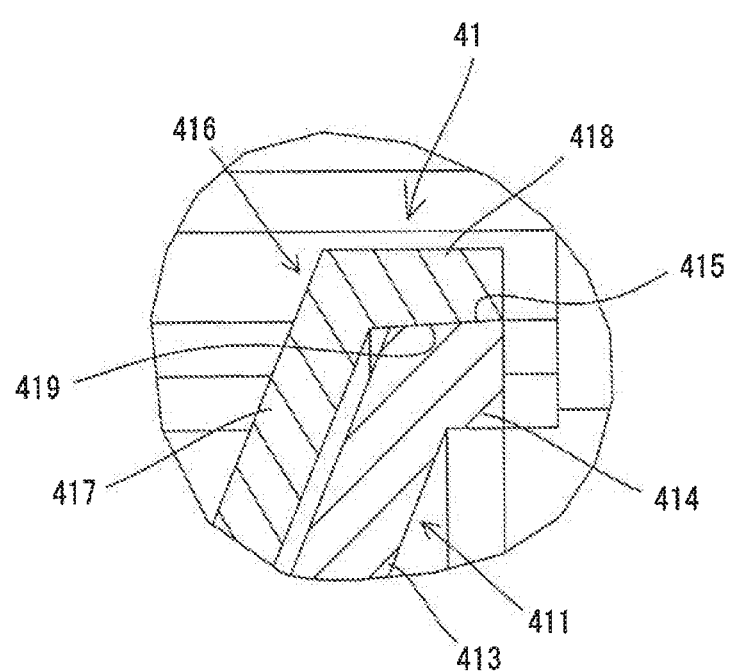
FIG. 6 is an enlarged view of the first and second engagement parts of the first clutch mechanism in FIG. 5.

In this embodiment, as shown in FIGS. 5 and 6, the whole first friction surface 415 rotates in close contact together with the second friction surface 419, so that an engaged state is established in which the first friction surface 415 and the second friction surface 419 are reliably engaged without slippage with each other. With such a structure, the rotation speed of the intermediate shaft 31 having the first engagement part 411 and the rotation speed of the rotary body 33 having the second engagement part 416 are synchronized with each other. The position of the striking unit 6 in the front-rear direction in this state is referred to as an intermediate position. As shown in FIG. 5, even when the striking unit 6 has moved to the intermediate position, the first clutch teeth 451 and the second clutch teeth 456 are still located apart from each other, so that the second clutch mechanism 45 is in the transmission interrupted state and has not yet started transmission.

Figure 7:
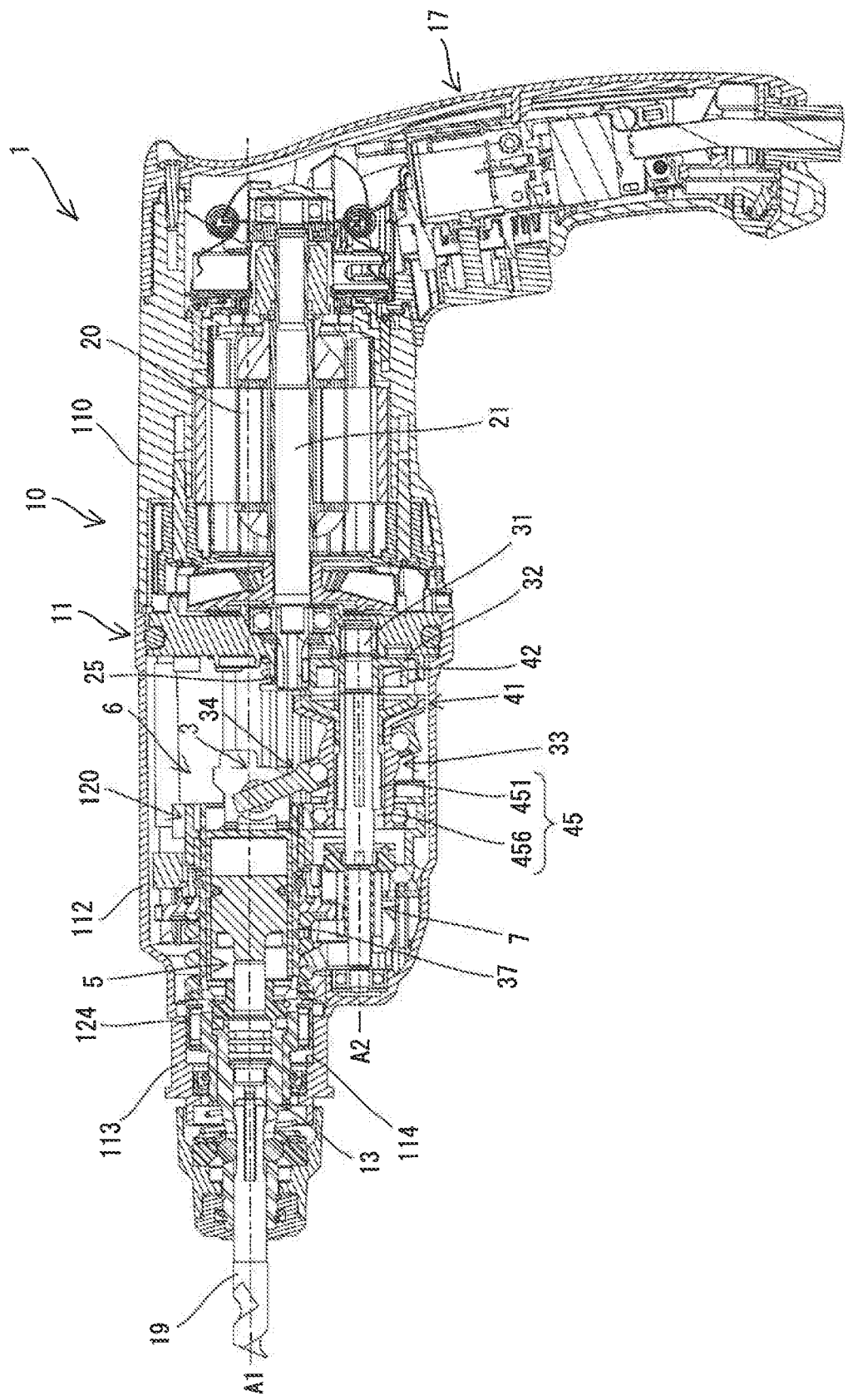
FIG. 7 is a longitudinal section view of the hammer drill in a rearmost position.

As the striking unit 6 further moves rearward, the second engagement part 416 moves rearward while further compressing the biasing spring 42 via the first engagement part 411. Meanwhile, the second clutch teeth 456 provided inside the front end part 332 of the rotary body 33 are engaged with the first clutch teeth 451 provided on the central part of the intermediate shaft 31, so that the second clutch mechanism 45 starts transmission of rotation from the intermediate shaft 31 to the rotary body 33. In other words, the second clutch mechanism 45 is also placed in the transmission state. At this time, the intermediate shaft 31 and the rotary body 33 rotate in synchronization, so that the first clutch teeth 451 and the second clutch teeth 456 are smoothly engaged with each other. As shown in FIG. 7, the striking unit 6 can move up to the rearmost position in which the biasing spring 42 is compressed to the maximum and the rotary body 33 is prevented from further moving rearward.

When pressing of the tool accessory 19 against the workpiece is released, the striking unit 6 moves forward from the rearmost position shown in FIG. 7 with respect to the body housing 11 by the biasing force of the compression coil springs 118. Accordingly, the rotary body 33 also moves forward with respect to the intermediate shaft 31. While the striking unit 6 moves from the rearmost position to the intermediate position shown in FIG. 5, first, the second clutch teeth 456 is moved apart from the first clutch teeth 451 and disengaged therefrom. Thus, transmission of rotation from the intermediate shaft 31 to the rotary body 33 by the second clutch mechanism 45 is interrupted and the second clutch mechanism 45 is placed in the transmission interrupted state. Meanwhile, the first engagement part 411 is biased forward by the biasing spring 42. Therefore, the first and second friction surfaces 415, 419 are kept in frictional engagement with each other, so that transmission of rotation from the intermediate shaft 31 to the rotary body 33 by the first clutch mechanism 41 is not interrupted.

Figure 4:
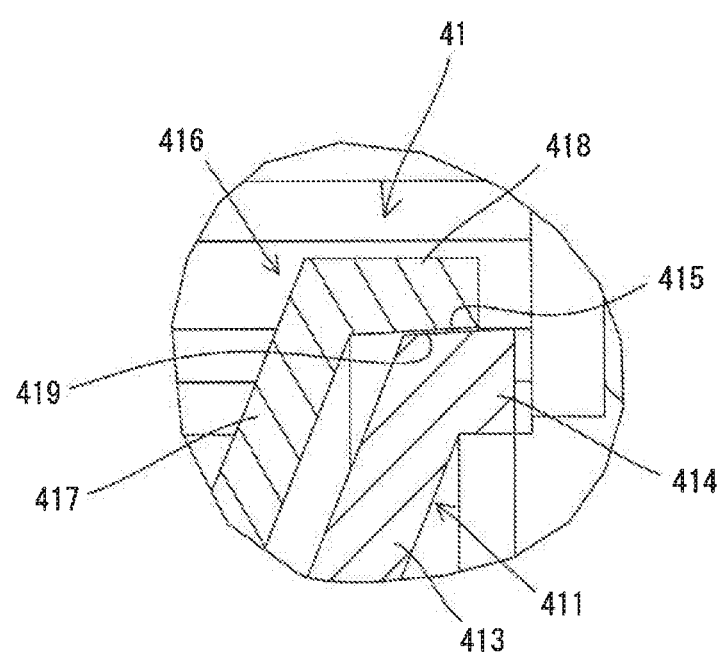
FIG. 4 is an enlarged view of first and second engagement parts of the first clutch mechanism in FIG. 1.

While the striking unit 6 further moves from the intermediate position to the foremost position shown in FIG. 1, the first engagement part 411 comes in contact with the rear end of the first clutch teeth 451 and then the second friction surface 419 is moved apart from the first friction surface 415 as shown in FIG. 4, so that frictional engagement between the first and second friction surfaces 415, 419 is released. Thus, transmission of rotation from the intermediate shaft 31 to the rotary body 33 by the first clutch mechanism 41 is also interrupted and the first clutch mechanism 41 is also placed in the transmission interrupted state. As a result, transmission of rotation from the intermediate shaft 31 to the rotary body 33 is completely interrupted, so that the hammer drill 1 stops the hammering operation. In a case where the hammer drill mode is selected, only rotational driving of the tool accessory 19 is maintained by the rotation transmitting mechanism 7.

As described above, the hammer drill 1 of this embodiment is configured such that the striking unit 6 including the tool holder 13 and the piston sleeve 37 can move with respect to the body housing 11 between the foremost position, in which the striking unit 6 is closer to the front end region of the body housing 11, and the rearmost position, in which the striking unit 6 is farther from the front end region than in the foremost position in the direction of the hammering axis A1 (the front-rear direction), according to the pressing force applied to the tool holder 13 via the tool accessory 19. In the power transmission path from the motor 20 which is the driving source of the tool accessory 19 to the swinging member 34 which reciprocates the piston cylinder 35 in the direction of the hammering axis A1, the first and second clutch mechanisms 41, 45 which are configured to transmit rotation of the intermediate shaft 31 to the rotary body 33 are disposed between the intermediate shaft 31 and the rotary body 33. The first and second clutch mechanisms 41, 45 are configured to start transmission while the striking unit 6 moves from the foremost position to the rearmost position and to interrupt transmission while the striking unit 6 moves from the rearmost position to the foremost position. Therefore, the load applied to transmit rotation from the intermediate shaft 31 to the rotary body 33 can be distributed to the two clutch mechanisms, that is, the first and second clutch mechanisms 41, 45.

Further, the first and second clutch mechanisms 41, 45 are different from each other in the timing of starting transmission and in the timing of interrupting transmission. Specifically, the first clutch mechanism 41 starts transmission while the striking unit 6 moves from the foremost position to the intermediate position, and the second clutch mechanism 45 starts transmission while the striking unit 6 moves from the intermediate position to the rearmost position. Further, the second clutch mechanism 45 interrupts transmission while the striking unit 6 moves from the rearmost position to the intermediate position, and the first clutch mechanism 41 interrupts transmission while the striking unit 6 moves from the intermediate position to the foremost position. Thus, the load on the second clutch mechanism 45 which starts transmission later and interrupts transmission earlier can be made smaller than the load on the first clutch mechanism 41.

Particularly, in this embodiment, the first clutch mechanism 41 is configured as the friction clutch mechanism which is configured to perform transmission by frictional engagement (in other words, engagement by frictional force) between the first and second friction surfaces 415, 419, while the second clutch mechanism 45 is configured as a positive clutch (or a dog clutch) mechanism which is configured to perform transmission by positive engagement (or mechanical engagement) between the first clutch teeth 451 and the second clutch teeth 456. Therefore, the first clutch mechanism 41 which starts transmission earlier smoothly establishes engagement while absorbing impact and synchronizes the rotation speeds of the intermediate shaft 31 and the rotary body 33. Thereafter, the second clutch mechanism 45 establishes more reliable engagement.

Further, the first and second engagement parts 411, 416 of the first clutch mechanism 41 are configured to move with respect to each other along the common rotation axis A2 in the directions in which the first and second friction surfaces 415, 419 come into contact with and apart from each other as the striking unit 6 moves with respect to the body housing 11. Specifically, the rotary body 33 having the second engagement part 416 is configured to move together with the tool holder 13 and the piston sleeve 37, as the striking unit 6, with respect to the body housing 11. With such a structure, the first and second engagement parts 411, 416 smoothly establish engagement according to movement of the striking unit 6.

Further, in this embodiment, the first clutch mechanism 41 includes the biasing spring 42 which is configured to bias the first engagement part 411 in such a direction that the first and second friction surfaces 415, 419 come into contact with each other. Thus, the biasing spring 42 can absorb impact caused by contact between the first and second friction surfaces 415, 419. Further, the frictional force between the first and second friction surfaces 415, 419 can be increased by the biasing force of the biasing spring 42 as the striking unit 6 moves toward the rearmost position in a state in which the first and second friction surfaces 415, 419 held in contact with each other. As a result, engagement between the first and second friction surfaces 415, 419 can be established more smoothly.

The first and second friction surfaces 415, 419 are each formed as a tapered surface (conical surface) inclined to the rotation axis A2 of the first and second engagement parts 411, 416. Therefore, by a wedge effect, the first and second friction surfaces 415, 419 can be strongly pressed against each other with a relatively small force in the direction of the rotation axis A2, so that reliable transmission can be achieved. Particularly, in this embodiment, the cone angles of the first and second friction surfaces 415, 419 are set to be relatively small, so that a larger wedge effect can be obtained. Further, the first and second friction surfaces 415, 419 are arranged relatively apart from the rotation axis A2 in a radially outward direction, so that larger torque can be obtained compared with a structure in which the first and second friction surfaces 415, 419 are arranged close to the rotation axis A2.

In this embodiment, the first and second clutch mechanisms 41, 45 are arranged on the opposite (front and rear) sides of the swinging member 34 in the direction of the rotation axis A2 (the front-rear direction). Specifically, the first clutch mechanism 41 (more specifically, the second engagement part 416) and the second clutch mechanism 45 (more specifically, the second clutch teeth 456) are arranged in the opposite (front and rear) end parts of the rotary body 33 which supports the swinging member 34, in the direction of the rotation axis A2 (the front-rear direction). In a structure, like in this embodiment, in which the swinging member 34 is supported by the rotary body 33 to be rotatable with respect to the rotary body 33 and to be swingable in the direction of the rotation axis A2, a region having a certain length in the swinging direction is needed as a space for swinging. Thus, it is likely that a dead space is formed on each side of the swinging member 34. In this embodiment, the first and second clutch mechanisms 41, 45 are arranged on the both sides of the swinging member 34 in the direction of the rotation axis A2 (or in the both end parts of the rotary body 33 in the direction of the rotation axis A2). In this manner, the dead spaces can be effectively utilized to efficiently arrange a plurality of clutch mechanisms which are different in the timings of starting and interrupting transmission.

Second Embodiment

A hammer drill 101 according to a second embodiment is now explained with reference to FIGS. 8 to 10. The hammer drill 101 of this embodiment is substantially identical to the hammer drill 1 of the first embodiment except that a first clutch mechanism 43 is different in structure from the first clutch mechanism 41 (see FIG. 3). Therefore, in the following description, components which are substantially identical to those in the first embodiment are given the same numerals as in the first embodiment and are not described or only briefly described, and the first clutch mechanism 43 and its operation are mainly described.

Figure 8:
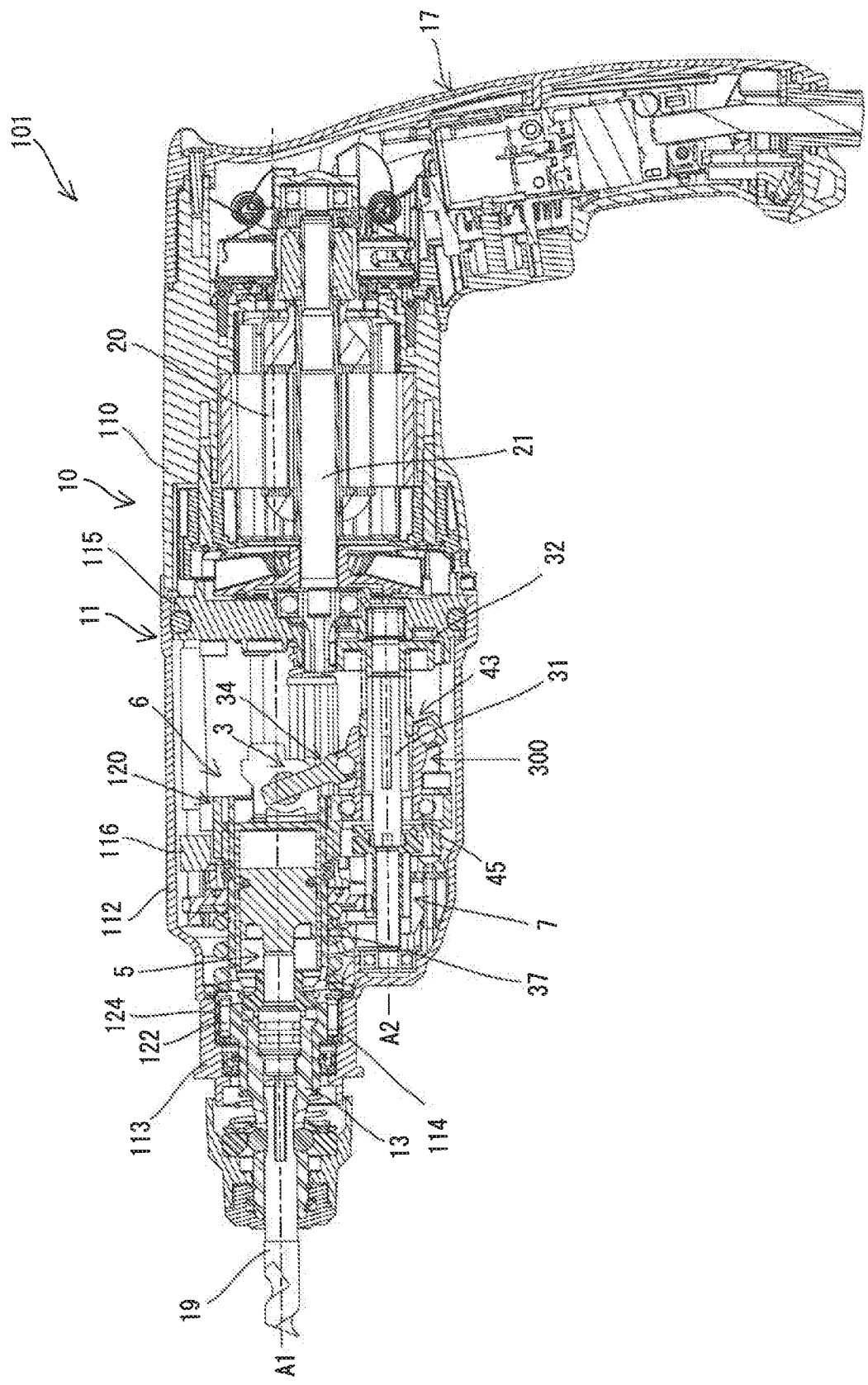
FIG. 8 is a longitudinal section view of a hammer drill according to a second embodiment of the present invention, in the foremost position.

As shown in FIG. 8, like in the first embodiment, the hammer drill 101 of this embodiment is also configured such that the striking unit 6 can move in the direction of the hammering axis A1 (the front-rear direction) with respect to the body housing 11. Further, on the power transmission path from the motor 20 which is the driving source of the tool accessory 19 to the swinging member 34 which reciprocates the piston cylinder 35 in the direction of the hammering axis A1, the first and second clutch mechanisms 43, 45 are disposed between the intermediate shaft 31 and a rotary body 300 which swingably supports the swinging member 34. The first and second clutch mechanisms 43, 45 are configured to transmit rotation of the intermediate shaft 31 to the rotary body 300.

Figure 9:
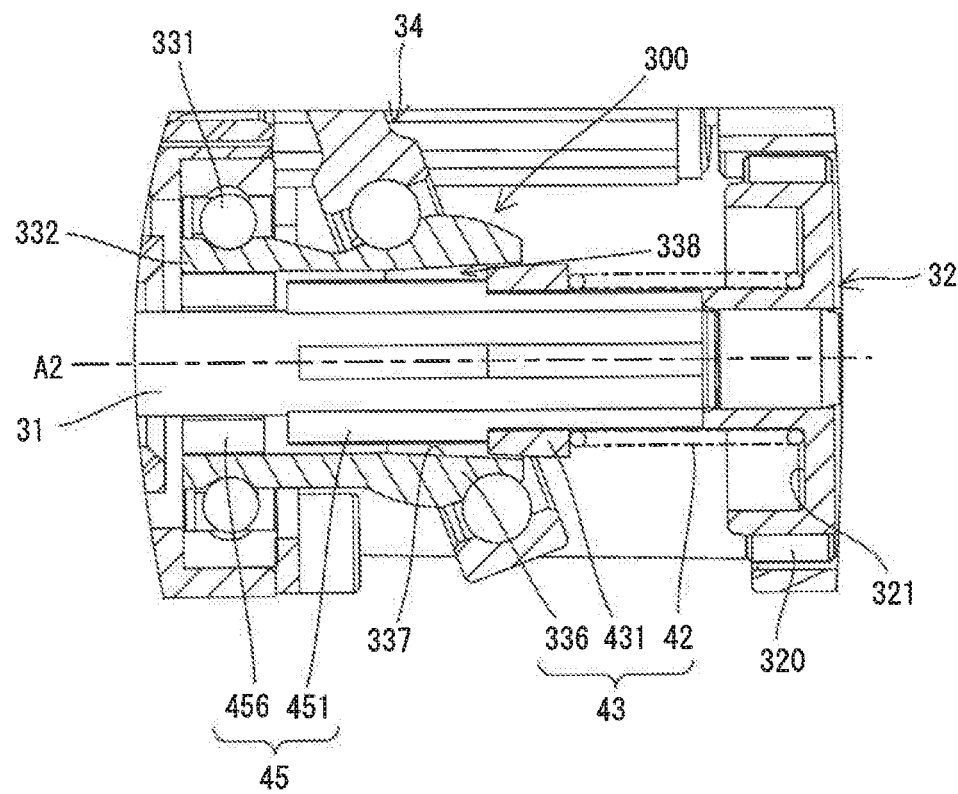
FIG. 9 is an enlarged view of first and second clutch mechanisms and their peripheral region in FIG. 8.

As shown in FIG. 9, the first clutch mechanism 43 of this embodiment includes a first engagement part 431, a second engagement part 336 and a biasing spring 42. Like in the first embodiment, the first clutch mechanism 43 is configured as a friction clutch mechanism (more specifically, a cone clutch) and the first and second engagement parts 431, 336 are configured to frictionally engage with each other.

The first engagement part 431 is spline-connected to the intermediate shaft 31 and configured to be rotatable together with the intermediate shaft 31 and to be movable in the direction of the rotation axis A2 (the front-rear direction) with respect to the intermediate shaft 31. The first engagement part 431 has a generally cylindrical shape. The first engagement part 431 has an outer peripheral surface which is formed as a first friction surface 435 (see FIG. 10). The first friction surface 435 is formed as a tapered surface which is conically shaped to have a diameter enlarged toward the rear. Further, the cone angle of the first friction surface 435 is set to be about 2 to 5 degrees.

The biasing spring 42 is disposed between a rear end surface of the first engagement part 431 and the bottom of the recess 321 of the first driven gear 32, and always biases the first engagement part 431 forward. Like in the first embodiment, the foremost position of the first engagement part 431 is defined by the first clutch teeth 451.

In this embodiment, like the rotary body 33 (see FIG. 3) of the first embodiment, the rotary body 300 is coaxially arranged with the intermediate shaft 31 and supported at the front end part 332 by the bearing 331 to be rotatable around the rotation axis A2. The swinging member 34 is supported by the rotary body 300 to be rotatable and swingable with respect to the rotary body 300. The second engagement part 336 forms a rear part of the rotary body 300 and also serves as a support part for the swinging member 34. A rear part of a through hole 338 extending through the rotary body 300 along the rotation axis A2 has a diameter enlarged toward the rear. An inner peripheral surface of the second engagement part 336 defines the rear part of the through hole 338 and forms a second friction surface 337. The second friction surface 337 is formed as a tapered surface which is conically shaped to have a diameter enlarged toward the rear. The angle of the second friction surface 337 is substantially identical to that of the first friction surface 435.

Figure 10:
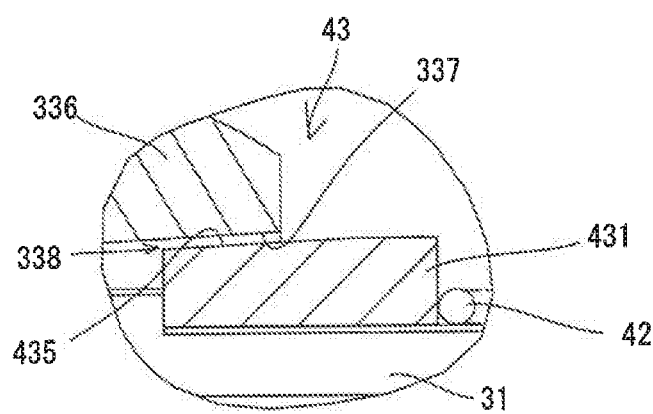
FIG. 10 is an enlarged view of first and second engagement parts of the first clutch mechanism in FIG. 8.

As shown in FIG. 10, in the unloaded state, the first friction surface 435 of the first engagement part 431 and the second friction surface 337 of the second engagement part 336 face each other with a slight clearance. Therefore, even if the first engagement part 431 rotates together with the intermediate shaft 31, the rotation is not transmitted to the second engagement part 336 of the rotary body 300. In other words, the first clutch mechanism 43 is in the transmission interrupted state in which rotation is not transmitted from the intermediate shaft 31 to the rotary body 300.

Also in this embodiment, when the tool holder 13 is pressed via the tool accessory 19, the striking unit 6 moves to the rearmost position by way of the intermediate position. In this process, the first clutch mechanism 43 starts transmission while the striking unit 6 moves from the foremost position to the intermediate position. Specifically, when the first engagement part 431 enters the through hole 338 from the rear and the first and second friction surfaces 435, 337 are caused to be frictionally engaged with each other, the first clutch mechanism 43 starts transmitting rotation from the intermediate shaft 31 to the rotary body 300. Further, when the first clutch teeth 451 and the second clutch teeth 456 are engaged with each other while the striking unit 6 moves from the intermediate position to the rearmost position, the second clutch mechanism 45 starts transmission. On the other hand, when the striking unit 6 moves forward with respect to the body housing 11, transmission by the second clutch mechanism 45 is interrupted while the striking unit 6 moves from the rearmost position to the intermediate position, and transmission by the first clutch mechanism 43 is interrupted while the striking unit 6 moves from the intermediate position to the foremost position.

As described above, the first clutch mechanism 43 of this embodiment is also configured as the friction clutch mechanism, and the first and second clutch mechanisms 43, 45 start and interrupt transmission of rotation from the intermediate shaft 31 to the rotary body 300 respectively at the same timings as in the first embodiment. Therefore, the hammer drill 101 of this embodiment can achieve the same effect as the hammer drill 1 of the first embodiment. Further, in the first clutch mechanism 43 of this embodiment, the second friction surface 337 is formed on the inner peripheral surface of the rotary body 300, and the first and second friction surfaces 435, 337 are frictionally engaged with each other when a part of the first engagement part 431 enters the through hole 338 of the rotary body 300. Therefore, the first clutch mechanism 43 can be reduced in size in the direction of the rotation axis A2. Further, the first and second friction surfaces 435, 337 are arranged relatively close to the rotation axis A2 in a radially outward direction, so that the first clutch mechanism 43 can also be reduced in size in the radial direction.

Third Embodiment

A hammer drill 102 according to a third embodiment is now explained with reference to FIGS. 11 to 13. The hammer drill 102 of this embodiment is substantially identical to the hammer drill 1 of the first embodiment except that a first clutch mechanism 44 is different in structure from the first clutch mechanism 41 (see FIG. 3). Therefore, in the following description, components which are substantially identical to those in the first embodiment are given the same numerals as in the first embodiment and are not described or only briefly described, and the first clutch mechanism 44 and its operation are mainly described.

Figure 11:
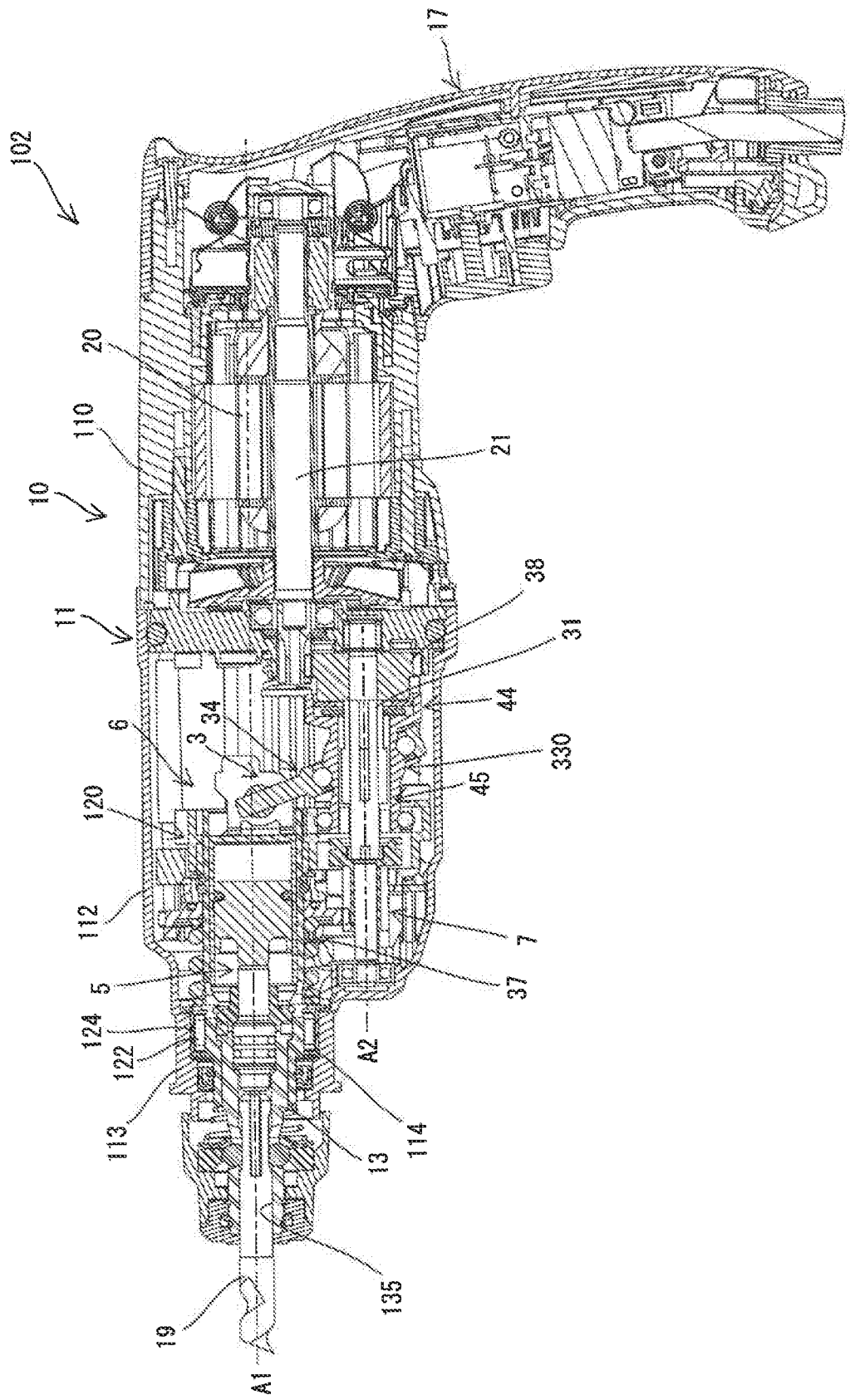
FIG. 11 is a longitudinal section view of a hammer drill according to a third embodiment of the present invention, in the foremost position.

As shown in FIG. 11, like in the first embodiment, the hammer drill 102 of this embodiment is also configured such that the striking unit 6 can move in the direction of the hammering axis A1 (the front-rear direction) with respect to the body housing 11. Further, on the power transmission path from the motor 20 which is the driving source of the tool accessory 19 to the swinging member 34 which reciprocates the piston cylinder 35 in the direction of the hammering axis A1, the first and second clutch mechanisms 44, 45 are disposed between the intermediate shaft 31 and a rotary body 330. The first and second clutch mechanisms 44, 45 are configured to transmit rotation of the intermediate shaft 31 to the rotary body 330.

Figure 12:
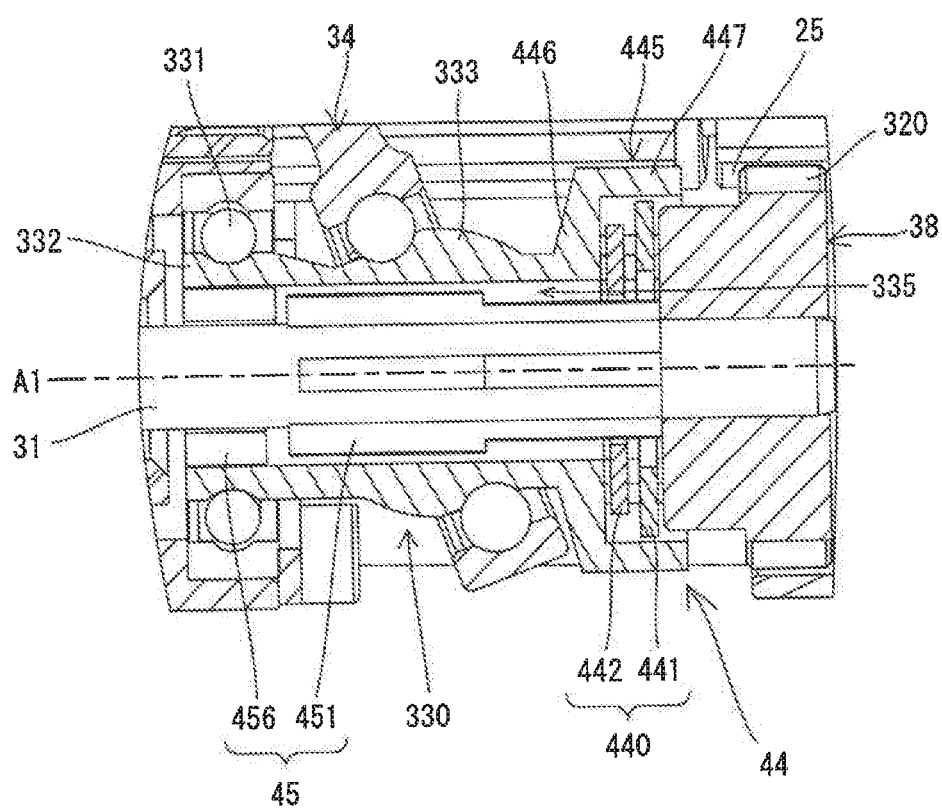
FIG. 12 is an enlarged view of first and second clutch mechanisms and their peripheral region in FIG. 11.

As shown in FIG. 12, the first clutch mechanism 44 of this embodiment includes a first driven gear 38, an engagement part 445 and a plurality of clutch discs 440. The first clutch mechanism 44 is configured as a multi-disc friction clutch mechanism.

As shown in FIG. 11, the first driven gear 38 is fixed to a rear end part of the intermediate shaft 31 and configured to rotate together with the intermediate shaft 31. The gear part 320 is formed on an outer periphery of the first driven gear 38 and engages with the first driving gear 25. The first driven gear 38 has a front end surface perpendicular to the rotation axis A2 of the intermediate shaft 31. The front end surface of the first driven gear 38 is configured as a friction surface 380 (see FIG. 13) that is configured to frictionally engage with a friction surface 443 of a first clutch disc 441 which is described below.

As shown in FIG. 12, the engagement part 445 forms a rear part of the rotary body 330. Like the rotary body 33 (see FIG. 3) of the first embodiment, the rotary body 330 is coaxially arranged with the intermediate shaft 31 and supported at the front end part 332 by the bearing 331 to be rotatable around the rotation axis A2. The rotary body 330 has a support part 333 by which the swinging member 34 is supported to be rotatable and swingable with respect to the rotary body 330. The engagement part 445 includes a flange part 446 and an outer edge part 447. The flange part 446 extends radially outward and rearward from a rear end of the support part 333 and is conically shaped to have a diameter enlarged toward the rear. The flange part 446 has a rear end surface which is perpendicular to the rotation axis A2 of the intermediate shaft 31. The rear end surface of the flange part 446 is configured as a friction surface 448 (see FIG. 13) that is configured to frictionally engage with the friction surface 443 of a second clutch disc 442 which is described below. The outer edge part 447 has a circular cylindrical shape extending rearward from the rear end of the flange part 446. The outer edge part 447 has spline grooves formed in its inner peripheral surface and extending in the front-rear direction.

The clutch discs 440 include the first clutch disc 441 and the second clutch disc 442. The first clutch disc 441 is spline-connected to the spline grooves of the outer edge part 447 and configured to rotate together with the rotary body 330 and to move in the front-rear direction with respect to the rotary body 330. The second clutch disc 442 is spline-connected to the intermediate shaft 31 and configured to rotate together with the intermediate shaft 31 and to move in the front-rear direction with respect to the intermediate shaft 31. As shown in FIG. 13, the first and second clutch discs 441, 442 are disposed between the friction surface 380 of the first driven gear 38 and the friction surface 448 of the engagement part 445.

Figure 13:
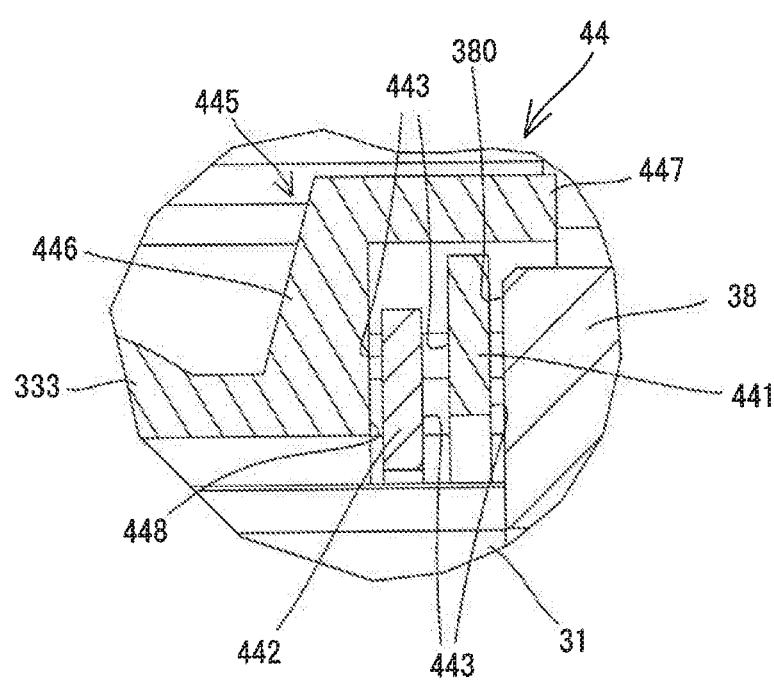
FIG. 13 is an enlarged view of first and second engagement parts of the first clutch mechanism in FIG. 11.

In FIGS. 11 to 13, for simplification of the drawings, one each of the first and second clutch discs 441, 442 are shown, but two or more each of the first and second clutch discs 441, 442 may be provided and arranged alternately in the front-rear direction. The front and rear surfaces of the first and second clutch discs 441, 442 are each formed as the friction surface 443 and configured to be frictionally engaged with any one of the friction surfaces 380, 448, 443.

As shown in FIG. 13, in the unloaded state, the first and second clutch discs 441, 442 are loosely disposed between the friction surface 380 of the first driven gear 38 and the friction surface 448 of the engagement part 445. In this state, the first driven gear 38, the engagement part 445, the first clutch disc 441 and the second clutch disc 442 are not pressed against each other and not frictionally engaged with each other. In other words, the first clutch mechanism 44 is in the transmission interrupted state in which rotation is not transmitted from the intermediate shaft 31 to the rotary body 300.

Also in this embodiment, when the tool holder 13 is pressed via the tool accessory 19, the striking unit 6 moves to the rearmost position by way of the intermediate position.

In this process, the first clutch mechanism 44 starts transmission while the striking unit 6 moves from the foremost position to the intermediate position. Specifically, the engagement part 445 of the rotary body 330 moves the second clutch disc 442 rearward by contact with the second clutch disc 442 and further moves the first clutch disc 441 rearward via the second clutch disc 442. In this process, friction is caused between the friction surfaces 448, 443, 380 which come into contact with each other and transmission of rotation from the intermediate shaft 31 to the rotary body 300 is started.

When the first clutch teeth 451 and the second clutch teeth 456 are engaged with each other while the striking unit 6 moves from the intermediate position to the rearmost position, the second clutch mechanism 45 starts transmission. Further, the timing when the second clutch mechanism 45 starts transmission is substantially the same as or slightly earlier than the timing when the first clutch mechanism 44 establishes engagement. Specifically, in this embodiment, the intermediate position can be considered not as a position in which the first clutch mechanism 44 establishes engagement but as a position of the first clutch mechanism 44 immediately after starting transmission. Also in this case, the first clutch mechanism 44 already starts transmission before the second clutch mechanism 45 starts transmission, so that a difference in the rotation speed between the intermediate shaft 31 and the rotary body 330 becomes smaller. Further, the rearmost position is a position in which the clutch discs 440 are held in close contact between the first driven gear 38 and the rotary body 330 and the rotary body 330 is prevented from further moving rearward.

When the striking unit 6 moves forward with respect to the body housing 11, transmission by the second clutch mechanism 45 is interrupted while the striking unit 6 moves from the rearmost position to the intermediate position, and transmission by the first clutch mechanism 44 is interrupted while the striking unit 6 moves from the intermediate position to the foremost position.

As described above, the first clutch mechanism 44 of this embodiment is also configured as the friction clutch mechanism, and the first and second clutch mechanism 44, 45 start and interrupt transmission of rotation from the intermediate shaft 31 to the rotary body 300 respectively at the same timings as in the first embodiment. Therefore, the hammer drill 102 of this embodiment can achieve the same effect as the hammer drill 1 of the first embodiment. Further, in the first clutch mechanism 44 which is configured as the multi-disc clutch mechanism, stress such as a frictional force which is applied to each of the clutch discs 440 can be reduced compared with a single-disc clutch mechanism, so that the life of the first clutch mechanism 44 can be prolonged. Further, relatively large torque can be obtained with respect to the radial size of the clutch discs 440 compared with a single-disc clutch mechanism.

Correspondences between the features of the embodiments and the features of the invention are as follow. Each of the hammer drills 1, 101, 102 is an example that corresponds to the "impact tool" according to this invention. The body housing 11 is an example that corresponds to the "tool body" according to this invention. The tool holder 13, the piston sleeve 37, the piston cylinder 35 and the motor 20 are examples that correspond to the "tool holder", the "cylindrical member", the "reciprocating member" and the "motor", respectively, according to this invention. The intermediate shaft 31 is an example that corresponds to the "first rotary body" according to this invention. Each of the rotary bodies 33, 300, 330 is an example that corresponds to the "second rotary body" according to this invention. The swinging member 34 is an example that corresponds to the "swinging member" according to this invention. Each of the first clutch mechanisms 41, 43, 44 is an example that corresponds to the "first clutch mechanism" according to this invention. The second clutch mechanism 45 is an example that corresponds to the "second clutch mechanism" according to this invention. The striking unit 6 is an example that corresponds to the "movable unit" according to this invention. The foremost position, the intermediate position and the rearmost position are examples that correspond to the "front end position", the "intermediate position" and the "separate position", respectively, according to this invention.

Each of the first engagement parts 411, 431 is an example that corresponds to the "first engagement part" according to this invention. Each of the second engagement parts 416, 336 is an example that corresponds to the "second engagement part" according to this invention. Each of the first friction surfaces 415, 435 is an example that corresponds to the "first friction surface" according to this invention. Each of the second friction surface 419, 337 is an example that corresponds to the "second friction surface" according to this invention. The biasing spring 42 is an example that corresponds to the "biasing part" according to this invention. The plurality of clutch discs 440 are an example embodiment that corresponds to the "plurality of discs" according to this invention. Each of the friction surfaces 380, 443, 448 is an example that corresponds to the "friction surface" according to this invention.

The above-described embodiments are merely examples, and an impact tool according to this invention is not limited to the structures of the hammer drills 1, 101, 102 that have been described as the representative embodiments. For example, they may be modified or changed as follows. Further, one or more of these modifications or changes may be applied in combination with any of the hammer drills 1, 101, 102 or with the claimed invention.

In the above-described embodiments, the hammer drill 1, 101, 102 which is capable of performing the drilling operation as well as the hammering operation is described as an example of the impact tool, but the impact tool may be an electric hammer which is capable of performing only the hammering operation (in other words, which does not have the bearings 122, 123 and the rotation transmitting mechanism 7).

In the above-described embodiments, as an example of a movable unit which can integrally move in the direction of the hammering axis A1 with respect to the body housing 11, the tool holder 13, the piston sleeve 37, the piston cylinder 35, the striking mechanism 5, the rotary body 33 and the swinging member 34 are held by the striking unit holder 120 and the bearing case 124. However, the movable unit, which can integrally move in the direction of the hammering axis A1 with respect to the body housing 11 according to the pressing force applied to the tool holder 13 via the tool accessory 19, may include at least the tool holder 13 and the piston sleeve 37. Thus, the manner in which the movable unit is held within the body housing 11 and elements other than the tool holder 13 and the piston sleeve 37 may be appropriately modified or changed. However, in a structure like in the above-described embodiments in which the piston cylinder 35 is arranged within the piston sleeve 37 and can be reciprocated in the direction of the hammering axis A1 by the swinging member 34 which swings according to rotation of the rotary body 33, 300, 330 around the rotation axis A2 extending in parallel to the hammering axis A1, it is preferable that the movable unit includes the rotary body 33, 300, 330 and the swinging member 34.

In the above-described embodiments, as an example of the structure in which the tool accessory 19 is driven via the striking mechanism 5, the bottomed cylindrical piston cylinder 35 is reciprocated within the piston sleeve 37 connected to the tool holder 13. In place of such a structure, a piston may be formed separately from a cylindrical cylinder and disposed to reciprocate in the direction of the hammering axis A1 within the cylinder connected to the tool holder 13.

In the above-described embodiments, the first engagement part 411, 431 of the first clutch mechanism 41, 43 is biased toward the second engagement part 416, 336 in such a direction that the first friction surface 415, 435 and the second friction surface 419, 337 come into contact with each other. However, the biasing spring 42 need not necessarily be provided. For example, the first engagement part 411, 431 may be fixed to the intermediate shaft 31. Further, the second engagement part 416, 336 may be formed separately from the rotary body 33, 300 and biased toward the first engagement part 411, 431 in such a direction that the first friction surface 415, 435 and the second friction surface 419, 337 come into contact with each other by a biasing spring which is disposed between the second engagement part 416, 336 and the rotary body 33, 300.

In the above-described embodiments, the first clutch mechanism 41, 43 is configured as a cone clutch, and the first friction surface 415, 435 and the second friction surface 419, 337 are formed as a tapered surface inclined with respect to the rotation axis A2. However, the first clutch mechanism 41, 43 may be configured as a disc clutch in which the first friction surface 415, 435 and the second friction surface 419, 337 extend in a direction perpendicular to the rotation axis A2.

In the first and second embodiments, the second clutch mechanism 45 is configured to start transmission after engagement of the first clutch mechanism 41, 43 is established. In such a structure, the rotation speeds of the intermediate shaft 31 and the rotary body 33, 300 can be preferably synchronized with each other. The timing when the second clutch mechanism 45 starts transmission, however, may be appropriately changed to any timing after the first clutch mechanism 41, 43 starts transmission.

In the above-described embodiments, in the unloaded state, the first clutch mechanism 41, 43, 44 and the second clutch mechanism 45 interrupt transmission of power to the swinging member 34 such that the tool accessory 19 is not linearly driven in the direction of the hammering axis A1 via the swinging member 34. The first clutch mechanism 41, 43, 44 and the second clutch mechanism 45 may be applied to a structure for exciting a dynamic vibration reducer or driving a counterweight via the swinging member 34 in order to interrupt transmission of power to the swinging member 34 in the unloaded state and to transmit power to the swinging member 34 in the loaded state like in the above-described embodiments.

In view of the nature of this invention and the above-described embodiments, the following features can be provided. The following features can be used in combination with the hammer drills 1, 101, 102 of the above-described embodiments, the above-described modifications or the claimed invention.

(Aspect 1)

The tool holder and the cylindrical member may be configured to rotate together around the hammering axis, and the impact tool may further include a rotary drive mechanism which is configured to rotate the tool holder and the cylindrical member around the hammering axis.

(Aspect 2)

The second rotary body may be configured to form a part of the movable unit, and to move in the direction of the hammering axis with respect to the tool body according to the pressing force applied to the tool holder via the tool accessory.

(Aspect 3)

The second engagement part may form a part of the second rotary body.

(Aspect 4)

The positive clutch mechanism may include a first engagement part which is formed on the first rotary body and a second engagement part which is formed on the second rotary body and configured to engage with the first engagement part.

(Aspect 5)

The swinging member may be supported by the second rotary body between the first clutch mechanism and the second clutch mechanism in the direction of the rotation axis, in such a manner that the swinging member is rotatable with respect to the second rotary body and swingable in the direction of the hammering axis.

DESCRIPTION OF THE NUMERALS 1, 101, 102: hammer drill
10: body
11: body housing
110: motor housing
112: gear housing
113: barrel
114: stepped part
115: rear support
116: central support
117: guide shaft
118: compression coil spring
120: striking unit holder
121: upper holding part
125: lower holding part
122, 123: bearing
124: bearing case
13: tool holder
135: insert hole
20: motor
21: output shaft
221: front bearing
222: rear bearing
23: fan
25: first driving gear
3: motion converting mechanism
31: intermediate shaft
311: front bearing
312: rear bearing
32, 38: first driven gear
320: gear part
321: recess
380: friction surface
33, 300, 330: rotary body
331: bearing
332: front end part
333: support part
335, 338: through hole
34: swinging member
35: piston cylinder
351: bottom 353: air chamber
37: piston sleeve
41, 43, 44: first clutch mechanism
411, 431: first engagement part
412: cylindrical part
413: flange
414: outer edge
415, 435: first friction surface
416, 336: second engagement part
417: flange
418: outer edge
419, 337: second friction surface
440: clutch disc
441: first clutch disc
442: second clutch disc
443, 448: friction surface
445: engagement part
446: flange
447: outer edge
42: biasing spring
45: second clutch mechanism
451: first clutch teeth
456: second clutch teeth
5: striking mechanism
51: striker
53: impact bolt
6: striking unit
7: rotation transmitting mechanism
70: second driving gear
72: spline engagement part
75: second driven gear
17: handle
171: handle housing
172: power cable
173: trigger
19: tool accessory

What is claimed is:

1. An impact tool configured to linearly drive a tool accessory in a direction of a hammering axis, the impact tool comprising:
   a tool body;
   a tool holder disposed in a front end region of the tool body and configured to hold the tool accessory such that the tool accessory is movable in the direction of the hammering axis with respect to the tool holder;
   a cylindrical member connected to the tool holder;
   a reciprocating member disposed within the cylindrical member such that the reciprocating member is reciprocatable in the direction of the hammering axis, the reciprocating member being configured to drive the tool accessory in the direction of the hammering axis;
   a motor;
   a first rotary body configured to be rotationally driven by the motor around a rotation axis, the rotation axis being parallel to the hammering axis;
   a second rotary body rotatably disposed and coaxially arranged with respect to the first rotary body;
   a swinging member configured to swing according to a rotation of the second rotary body and reciprocate the reciprocating member in the direction of the hammering axis; and
   a plurality of clutch mechanisms disposed between the first rotary body and the second rotary body on a power transmission path from the motor to the swinging member, each clutch mechanism of the a plurality of clutch mechanisms being configured to transmit a rotation of the first rotary body to the second rotary body,
   wherein:
   the tool holder and the cylindrical member are configured to move together as a movable unit, the moveable unit configured to move with respect to the tool body between a front end position and a separate position according to a pressing force applied to the tool holder via the tool accessory, the movable unit being farther from the front end region in the separate position than in the front end position in the direction of the hammering axis, and
   each clutch mechanism of the plurality of clutch mechanisms is configured to start transmission while the movable unit moves from the front end position to the separate position and interrupt transmission while the movable unit moves from the separate position to the front end position.

2. The impact tool as defined in claim 1, wherein:
   the plurality of clutch mechanisms include a first clutch mechanism and a second clutch mechanism,
   the movable unit is configured to be move between the front end position and the separate position via an intermediate position, the intermediate position of the movable unit being located between the front end position and the separate position in the direction of the hammering axis,
   the first clutch mechanism is configured to start transmission while the movable unit moves from the front end position to the intermediate position and interrupt transmission while the movable unit moves from the intermediate position to the front end position, and
   the second clutch mechanism is configured to start transmission while the movable unit moves from the intermediate position to the separate position and interrupt transmission while the movable unit moves from the separate position to the intermediate position.

3. The impact tool as defined in claim 2, wherein:
   the first clutch mechanism is a friction clutch mechanism configured to perform transmission by frictional engagement, and
   the second clutch mechanism is a positive clutch mechanism configured to perform transmission by positive engagement.

4. The impact tool as defined in claim 3, wherein:
   the friction clutch mechanism includes:
   a first engagement part configured to rotate around the rotation axis together with the first rotary body, the first engagement part having a first friction surface, and
   a second engagement part configured to rotate around the rotation axis together with the second rotary body, the second engagement part having a second friction surface, the second friction surface being frictionally engageable with the first friction surface, and
   the first and second engagement parts are configured to move with respect to each other along the rotation axis and in directions in which the first and second friction surfaces come into contact with and separate from each other along with movement of the movable unit.

5. The impact tool as defined in claim 4, wherein:
   the friction clutch mechanism includes a biasing part configured to bias at least one of the first engagement part and the second engagement part such that the first and second friction surfaces come into contact with each other, and
   a biasing force of the biasing part increases a frictional force between the first friction surface and the second friction surface as the movable unit moves toward the separate position in a state in which the first friction surface and the second friction surface are held in contact with each other.

6. The impact tool as defined in claim 3, wherein the friction clutch mechanism is configured to perform transmission by frictional engagement between tapered surfaces, the tapered surfaces being inclined with respect to the rotation axis.

7. The impact tool as defined in claim 3, wherein the friction clutch mechanism is a multi-disc clutch mechanism, the multi-disc clutch mechanism including a plurality of discs and each disc of the plurality of discs having at least one friction surface.

8. The impact tool as defined in claim 1, wherein:
the tool holder and the cylindrical member are configured to rotate together around the hammering axis, and
the impact tool further comprises a rotary drive mechanism configured to rotate the tool holder and the cylindrical member around the hammering axis.

9. The impact tool as defined in claim 1, wherein the second rotary body forms a part of the movable unit, the secondary rotary body being configured to move in the direction of the hammering axis with respect to the tool body according to the pressing force applied to the tool holder via the tool accessory.

10. The impact tool as defined in claim 4, wherein the second engagement part forms a part of the second rotary body.

11. The impact tool as defined in claim 3, wherein the positive clutch mechanism includes:
a first engagement part formed on the first rotary body; and
a second engagement part formed on the second rotary body and configured to engage with the first engagement part.

12. The impact tool as defined in claim 2, wherein the swinging member is supported by the second rotary body between the first clutch mechanism and the second clutch mechanism in a direction of the rotation axis such that the swinging member is rotatable with respect to the second rotary body and swingable in the direction of the hammering axis.

13. The impact tool as defined in claim 1, wherein the cylindrical member and the tool holder are attached and immovable with respect to each other in the direction of the hammering axis.

14. The impact tool as defined in claim 1, wherein the second rotary body is configured to transmit power only to the swinging member.

15. The impact tool as defined in claim 1, wherein the plurality of clutch mechanisms includes:
a first clutch mechanism configured to perform transmission by frictional engagement between friction surfaces, and
a second clutch mechanism configured to perform transmission by positive engagement between a plurality of teeth.

16. The impact tool as defined in claim 1, further comprising a guide shaft supported by the tool body and extending substantially parallel to the hammering axis, the guide shaft supporting the movable unit such that the moveable unit is movable in the direction of the hammering axis with respect to the tool body.

17. The impact tool as defined in claim 1, wherein the each of the plurality of clutch mechanisms extend further away from the front end region than the second rotary body.

* * * * *